United States Patent [19]

Turpin

[11] Patent Number: 5,384,573
[45] Date of Patent: Jan. 24, 1995

[54] IMAGE SYNTHESIS USING TIME SEQUENTIAL HOLOGRAPHY

[75] Inventor: Terry M. Turpin, Columbia, Md.

[73] Assignee: Essex Corporation, Columbia, Md.

[21] Appl. No.: 32,696

[22] Filed: Mar. 17, 1993

Related U.S. Application Data

[63] Continuation of Ser. No. 811,903, Dec. 20, 1991, abandoned, which is a continuation-in-part of Ser. No. 604,255, Oct. 29, 1990, Pat. No. 5,079,555.

[51] Int. Cl.$^6$ .................... G01S 13/89; A61B 5/055; G06E 3/00; G06F 15/62
[52] U.S. Cl. ............................ 342/179; 128/653.1; 359/32; 364/413.19; 364/822; 378/87
[58] Field of Search ............... 364/413.19, 413.2, 822; 382/17, 31; 342/179; 378/87; 128/653.1

[56] References Cited

U.S. PATENT DOCUMENTS

| | | | |
|---|---|---|---|
| 3,685,008 | 8/1972 | Bhuta et al. | 367/8 |
| 3,803,606 | 4/1974 | Lebail et al. | 342/179 |
| 3,805,596 | 4/1974 | Klahr | 367/7 |
| 4,023,175 | 5/1977 | Brown et al. | 342/179 |
| 4,305,666 | 12/1981 | Becherer et al. | 356/349 |
| 4,584,484 | 4/1986 | Hutchin | 250/550 |
| 4,641,273 | 2/1987 | Casasent | 364/822 |
| 4,662,222 | 5/1987 | Johnson | 73/602 |
| 4,716,414 | 12/1987 | Luttrell et al. | 342/179 |
| 4,768,156 | 8/1988 | Whitehouse et al. | 342/179 X |
| 4,848,907 | 7/1989 | Yokokura et al. | 356/347 |
| 4,929,951 | 5/1990 | Small | 342/179 |
| 4,955,974 | 9/1990 | Rhodes et al. | 378/36 |
| 4,973,111 | 11/1990 | Haacke et al. | 324/309 |
| 5,121,241 | 6/1992 | Spivey et al. | 342/179 |

OTHER PUBLICATIONS

"Time-Integrating Compact Hybrid Optical Processor for SAR Image Formation"; Aleksoff et al.; SPIE vol. 1704–Advances in Optical Information Processing V (1992).

"Compact Real-Time Inter Ferometric Fourier Transform Processors"; Aleksoff et al.; SPIE vol. 1347 (1990).

"Temporaily Modulated Holography"; Aleksoff; Applied Optics, vol. 10, No. 6, Jun. 1971.

(List continued on next page.)

*Primary Examiner*—Gilberto Barrón, Jr.
*Attorney, Agent, or Firm*—Spensley Horn Jubas & Lubitz

[57] ABSTRACT

A method and apparatus for producing an image of a target area, by: at an observation location spaced from the target area, transmitting a beam of electromagnetic radiation toward the target area, and receiving reflections of the radiation from the target area; providing a representation of the magnitude and direction of the distance between points on the target area which produce reflections that travel in phase to the observation location; varying the spatial relation between the observation location and the target area and/or the given radiation frequency, in order to establish a plurality of different observation states which succeed one another in time, each state being associated with a distinct combination of magnitude and direction of the distance between points on the target area which produce reflections that travel in phase to the observation location; producing two coherent radiation beams, directing the two beams onto a receiving plane provided with an array of radiation receiving cells and storing output signals from each receiving cell, and controlling the two beams, for each observation state in succession, such that the two collimated beams have: beam axes which are inclined relative to one another by an angle corresponding in magnitude and direction to the magnitude and direction representations; a phase difference corresponding to the phase difference between the transmitted and received radiation; and intensities such that the product of the intensities of the two beams corresponds to the intensity product of the transmitted and received radiation.

157 Claims, 14 Drawing Sheets

OTHER PUBLICATIONS

"Real-time Programmable Acoustooptic Synthetic Aperture Radar Processor"; Haney et al.; Applied Optics, vol. 27, No. 9, May 1988.

"Acouso-optic Processing of Two-dimensional Signals"; Psaltis; J. Opt. Soc. Am.; vol. 71, No. 2; Feb. 1981.

"Photoacoustic Imaging Using a Fourier Transform Technique", Covfal et al., Applied Optics; vol. 21, No. 13, Jul., 1982.

"Acoustooptic Spectrum Analysis: A High Performance Hybrid Technique"; Bader; Applied Optics; vol. 18, No. 10–May 1979.

"Optical-Hybrid Backprojection Processing"; Aleksoff et al.; IEEE; 1983.

"Optical Reconstruction of Coded Aperture Images", Indebetown et al.; Optical Society of America; 1981 Annual Meeting.

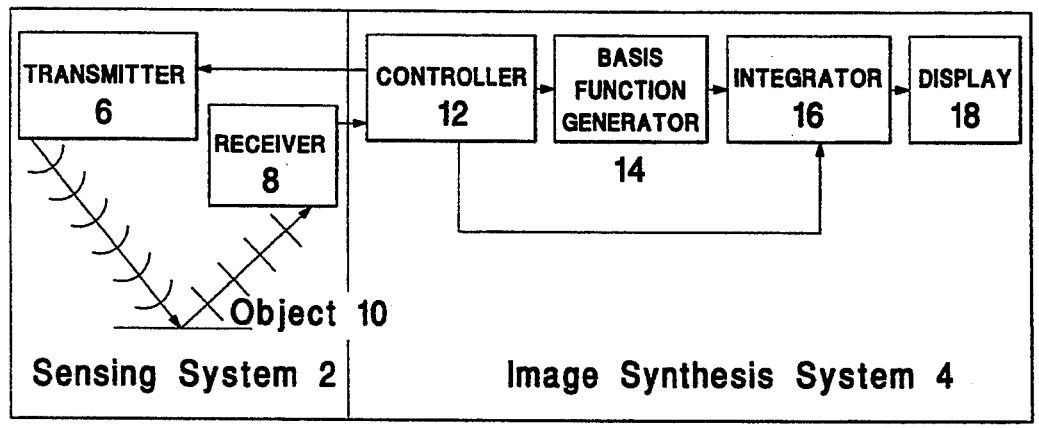
Figure 1
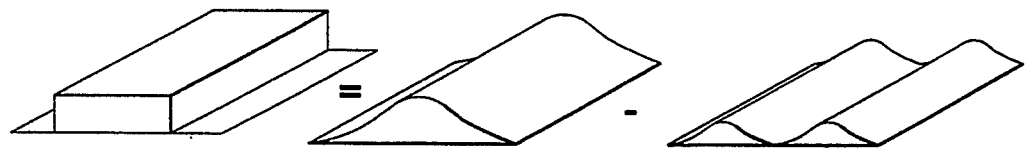
Figure 2
Figure 3(a)
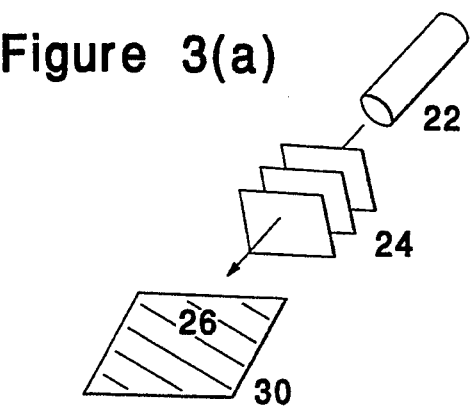
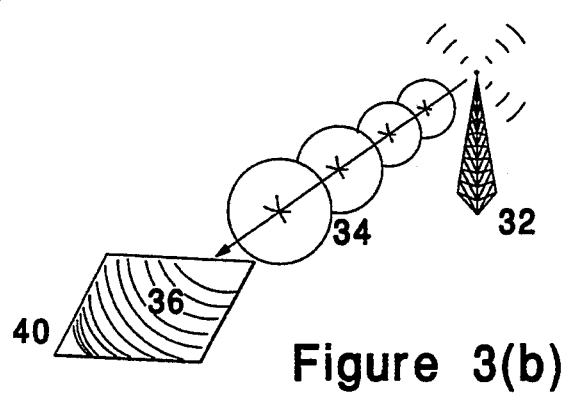
Figure 3(b)

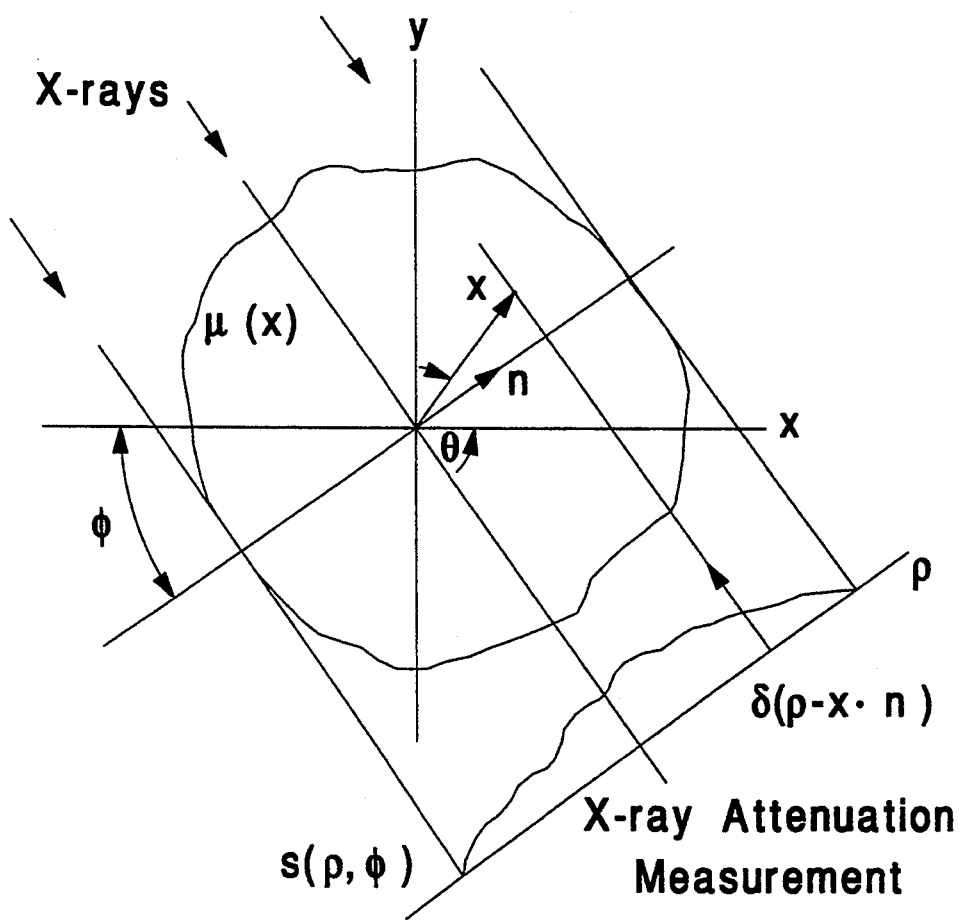
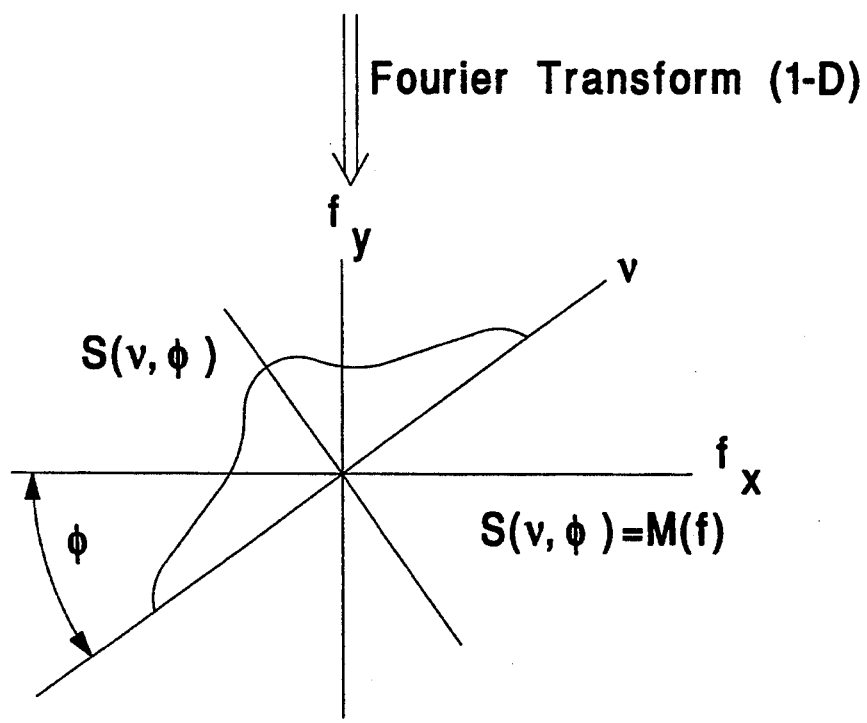
Figure 8

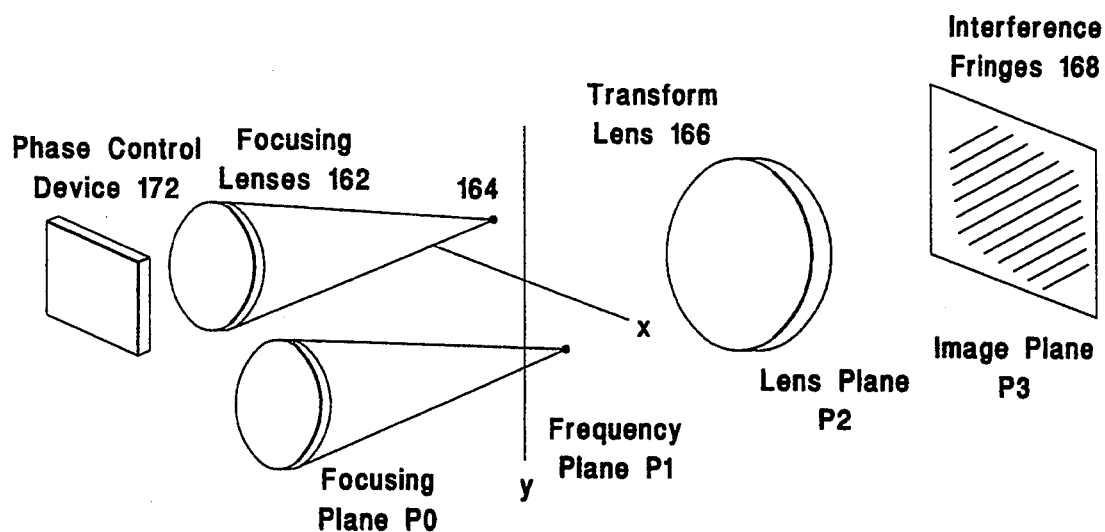
Figure 12
Figure 13
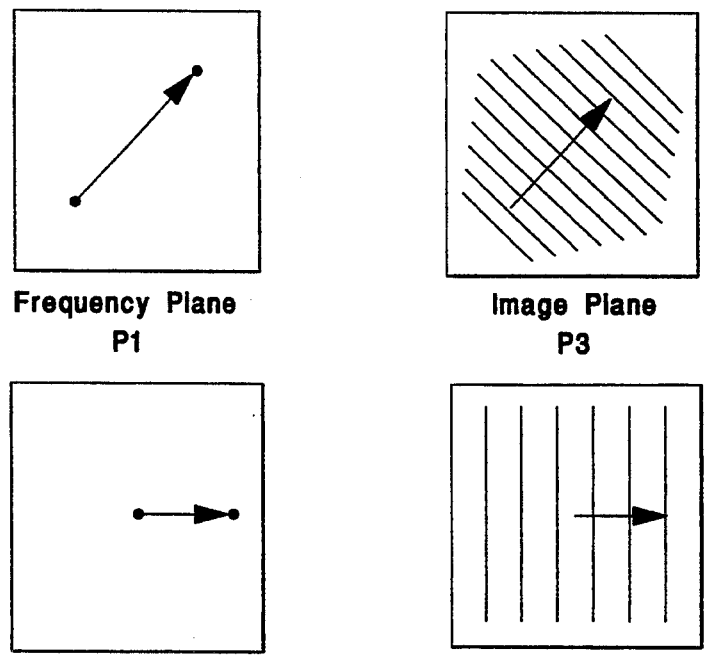
Frequency Plane P1
Image Plane P3

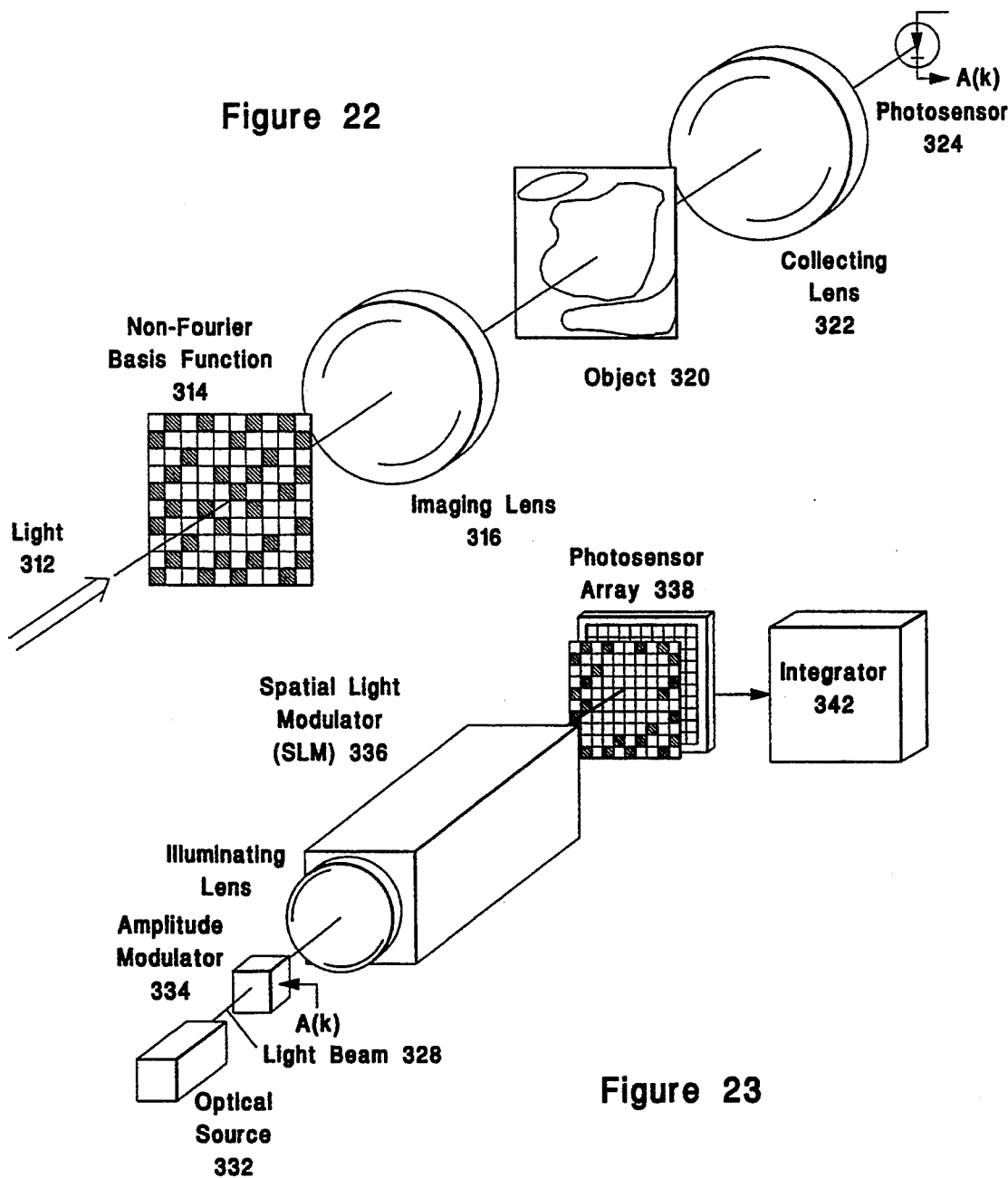

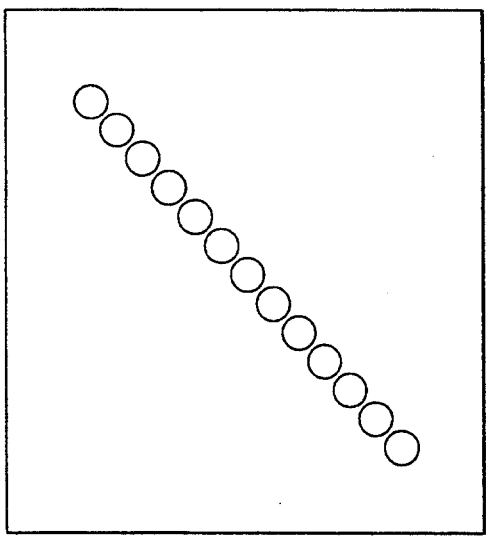 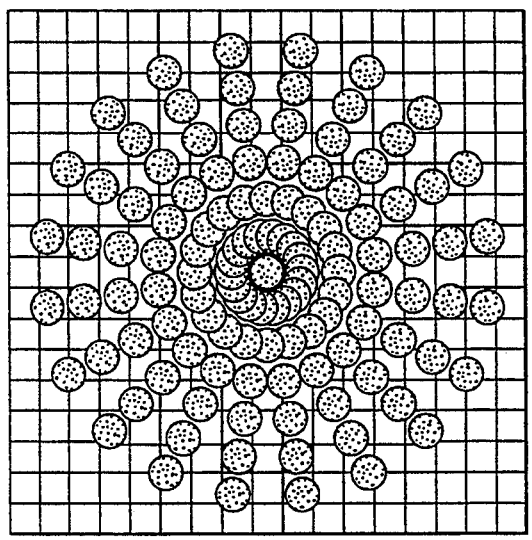
Polar Frequency Data 392　　Rectilinear CCD Array 394
　　　　　　　　　　　　　　　　Photosensor
Figure 26

IMAGE SYNTHESIS USING TIME SEQUENTIAL HOLOGRAPHY

This is a continuation of application Ser. No. 07/811,903 filed Dec. 20, 1991, now abandoned, which is a continuation-in-part of U.S. application Ser. No. 07/604,255, filed Oct. 29, 1990 now U.S. Pat. No. 5,079,555.

BACKGROUND OF THE INVENTION

1. Field of the Invention

The present invention relates to a system for generating images from the results of linear sensing processes.

2. Description of Related Art

Image synthesis systems generate images from the results of linear sensing processes. The most common forms of image synthesis systems are optical lens-based systems, such as eyes, cameras, binoculars, telescopes, microscopes, etc. Other forms of image synthesis include imaging radars, electron beam microscopes, medical x-rays, x-ray computerized tomography, magnetic resonance imaging and sonar systems.

Known digital image synthesis systems suffer from a number of inherent disadvantages. For example, some known image synthesis systems reconstruct images by using digital technology to sequentially address every pixel of an image. This requirement of sequentially addressing each pixel imposes a limit on the speed with which images may be reconstructed.

In addition, in most known digital image synthesis systems the reconstruction of an image requires the performance of at least two steps. First, the polar or spherical coordinates of a spatial frequency must be linearly transformed into rectangular coordinates. Second, the complex amplitudes of the spatial frequency components must be interpolated between neighboring data elements. This interpolation step may be extremely time consuming and may introduce errors into the resulting image.

Moreover, common optical imaging systems based on physical lenses are capable of providing numerical apertures of approximately 0.5. Rarely do such known systems provide numerical apertures approaching 1.0, and then only when the object and the lens are immersed in a fluid having an index greater than air. In addition, common optical imaging systems based on physical lenses form images that are limited in quality by the aberrations of those real lenses.

It is an object of the present invention to provide an imaging system that is not limited by the characteristics of physical lenses, and that is capable of achieving higher numerical apertures and better spatial resolution capabilities than conventional optical systems based on physical lenses.

It is a further object of the present invention to provide an imaging system that avoids lens aberrations inherent in prior art imaging systems that use real lenses.

It is another object of the present invention to provide for the simultaneous projection of image elements onto every pixel of a photodetector array, thereby enabling greater image synthesis speed in comparison to digital computer based systems.

It is another object of the present invention to provide an imaging system that can operate easily in non-rectangular coordinate systems, and that does not require the performance of an interpolation step.

SUMMARY OF THE INVENTION

In accordance with the present invention, these and other objectives are achieved by providing a system that is based upon the recognition that an object may be represented as a combination of spatial, orthogonal basis functions. Both the amplitude and the phase of the spatial components of the basis functions may be measured in a sensing process. The individual basis function components of the object measured in the sensing process may be regenerated and integrated by an optical computing system.

The sensing and image synthesis process that is performed by a system in accordance with the present invention is referred to herein as a "Time Sequential Holography" or "TSH" process. The TSH process is referred to as holographic because the process makes use of both the amplitude and the phase of a measurement signal to construct an image, as in standard optical holography. The TSH process is also referred to as time-sequential because measurements are made sequentially and independently of each other.

A system in accordance with the present invention synthesizes images by sequentially summing scaled spatial basis function components, the complex amplitudes of which are detected through a sensing process. Examples of these components include spatial Fourier components (sinusoids), parabolic or spherical wave functions, or non-Fourier wavelets sometimes used in image compression.

A sensing process in accordance with the present invention may be described by using terminology similar to that used to describe a Bragg scattering process (after the theory of x-ray scattering from crystal structures). Regardless of whether the sensing mechanism is a wave scattering process or a non-wave scattering process, the process may be viewed as a Bragg-matching process. This characterization of the sensing process enables a system in accordance with the present invention to be applicable to such seemingly unrelated phenomena as, for example, radar scattering from the earth's surface and x-ray computerized tomography (also referred to herein as "CT").

In the case of radar, for example, an object may be modeled as a set of diffraction gratings that combine to form the object reflectivity. The Bragg scattering condition enables a sensing system in accordance with the present invention to use radio waves of particular spatial frequency to detect features in the object of specific spatial frequency.

In the case of computerized tomography, for example, an incoming uniform x-ray beam may be viewed as a Fourier expansion of spatially modulated x-ray intensities that project their spatial frequency spectrum onto x-ray detectors. The resultant spectrum is a consequence of a Bragg condition that may be derived from the well-known projection-slice theorem of Fourier analysis.

While a sensing process in accordance with the present invention need not be optically based, many optical analogues to this concept are useful. The most basic devices that form images are dependent on the properties of physical lenses. Lens-based systems have intrinsic limitations due to lens aberrations. Theoretically, a system in accordance with the present invention is able to synthesize images with relatively reduced aberrations and greater spatial resolution.

While optical terminology is useful to describe several preferred embodiments of the present invention, and several preferred embodiments of the present invention use an optical computer, the imaging capabilities of the present invention are not confined to optical sensing processes. For example, other forms of electromagnetic radiation, spatially varying fields (e.g. the magnetic field gradients of Magnetic Resonance Imaging or "MRI"), acoustical waves, or other sensing systems, may be used to measure the physical properties of an object. Provided the sensing mechanism is linear, the present invention can synthesize images from virtually any sensing data.

Standard optical systems image optical properties such as luminance, reflectance, and transmittance of visible or near-visible radiation. A TSH system in accordance with the present invention may be applied to imaging applications which include, for example, visible light photography, microscopy, ultrasonic imaging, tomography applications including CT scanning and magnetic resonance imaging, radar applications such as synthetic aperture radar (SAR), LIDAR, and ISAR, and seismological imaging. A TSH system in accordance with the present invention may also find application in holographic memory and image communication technologies such as, for example, HDTV, picture phones, and teleconferencing.

BRIEF DESCRIPTION OF THE DRAWINGS

A detailed description of the preferred embodiments of the present invention will be made with reference to the accompanying drawings.

FIG. 1 shows a block diagram of an example of a TSH system.

FIG. 2 shows an example of a decomposition of a two-dimensional rectangle function into its sinusoidal components.

FIG. 3($a$) shows an example of a laser producing planar wave fronts that create sinusoidal basis functions in an object plane.

FIG. 3($b$) shows an example of a radio transmitter emitting spherical wavefronts that produce curved basis functions on an object plane.

FIG. 6$b$ shows an example of a relationship between an angle $\alpha$ and an incidence angle $\theta$ of a sensing wave vector relative to the object normal.

FIG. 8 shows an example of the geometry of a tomographic projection.

FIG. 12 shows an example of a method for generating a basis function on a photosensor.

FIG. 13 shows an example of a relationship between a point source separation in a frequency plane P1 and spatial frequency components in an image plane P3.

FIG. 22 shows an example of a system for sensing an object using non-Fourier basis functions.

FIG. 23 shows an example of optical reconstruction using generalized basis functions.

FIG. 26 shows an example of polar frequency data written on a rectangular array of photosensors.

DESCRIPTION OF THE PREFERRED EMBODIMENTS

Figure 4:
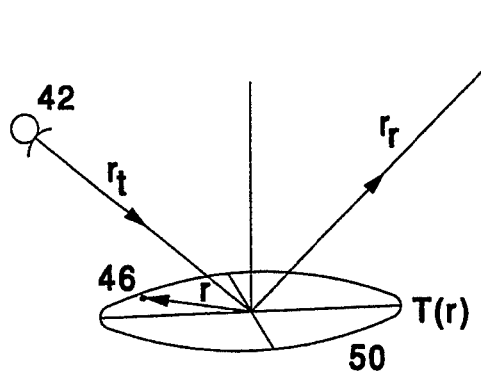
FIG. 4 shows an example of a co-ordinate system for a transmitter and a receiver that are not co-located.

The following detailed description is of the best presently contemplated modes of carrying out the present invention. This description is not to be taken in a limiting sense, but is made merely for the purpose of illustrating the general principles of the invention. The scope of the invention is best defined by the appended claims.

In its preferred embodiment, a TSH system in accordance with the present invention utilizes the amplitude, phase, and vector spatial frequency of each basis function to generate a reconstructed image of an object. A sensing system performs the function of measuring the amplitude and phase of individual basis function components of the object. An image synthesis system uses this information to generate scaled copies of the basis functions sensed in the object, project them onto a photosensor array and integrate them to form an image on a display device. The image synthesis system may also process additional parameters, such as curvature, that may characterize the basis functions.

As illustrated in FIG. 1, for example, in its preferred embodiment a TSH system in accordance with the present invention comprises two basic parts: a sensing system 2 and an image synthesis system 4. The sensing system 2 generally includes both a transmitter 6 and a receiver 8. The image synthesis system, an example of which is shown as element 4 in FIG. 1, is alternatively referred to herein as the "ImSyn TM" system.

As shown in FIG. 1, in its preferred embodiment the sensing system 2 includes a signal generator or transmitter 6. The transmitter 6 performs the function of generating a signal that will interact with the object 10 to be imaged. Typically, the signal generated by the transmitter 6 may be spatially modulated with a waveform, so that the response of the object 10 to the signal will depend upon the position of the signal within the object. Typically, the signal generated by the transmitter 6 will comprise some form of electromagnetic radiation, although the signal is not necessarily required to be in the form of electromagnetic radiation. Representative examples of a transmitter 6 include a radio antenna, a laser, an x-ray tube or an acoustic source.

As further shown in FIG. 1, in its preferred embodiment the sensing system 2 also includes a detector or receiver 8. The receiver 8 performs the function of measuring the response of the object 10 to the signal transmitted by the transmitter 6. The receiver 8 receives a signal reflected by the object 10 and compares the received signal to a reference signal. The amplitude and the phase of the basis functions of the object 10 may be obtained by this comparison. The receiver 8 produces an output signal that corresponds to the amplitude and the phase of the received signal. Representative examples of a receiver 8 include a radio antenna, a photodetector, an x-ray detector or an acoustic transducer (depending on the transmitted signal).

Several known sensing systems may be used in a TSH system in accordance with the present invention, as long as the mapping from the sensing system measurements to the ImSyn TM system is known. The mechanism for accomplishing this mapping is referred to herein as a controller.

Again referring to FIG. 1, in its preferred embodiment a controller 12 is incorporated as the front-end of the ImSyn TM system 4. The controller 12 may comprise an electronic system that provides drive signals to the transmitter 6, obtains data from the receiver 8, controls the operation of the ImSyn TM system 4, and coordinates the timing of the TSH process. The controller 12 may also determine the parameters of the basis functions measured in the object 10 and communicates those parameters to the remainder of the ImSyn TM system 4. The controller 12 provides the transmitter 6 with the frequency parameters necessary to extract a specific basis function from the object 10. The frequency parameter, together with the known geometry of the system, monitored by the controller 12, determines the two- or three-dimensional spatial frequency components of a given basis function. The controller may remove a carrier frequency from the spatial frequency data to center the spatial frequency bandwidth on any spatial frequency, including zero, to reduce the resolution retirements of the photosensor array.

The controller 12 extracts the amplitude and the phase of the received signal from the receiver 8. The controller 12 uses the amplitude and the phase of the received signal and geometry information to control the amplitude, phase, and spatial frequency of an optical wave pattern synthesized by the basis function generator 14. The controller also sets the timing of the outputs of the basis function generator 14 and the integrator 16.

As shown in FIG. 1, in a preferred embodiment the ImSyn TM system 4 includes a basis function generator 14. The basis function generator 14 may comprise an electronic and optical system that uses the amplitude, phase, and spatial frequency outputs from the controller 12 to generate a scaled copy of the object basis function. The basis function may be recreated by the interference of optical waves. This spatial pattern may be detected by a pixelated photosensor array such as a charge-coupled device array (CCD). The photosensor array integrates many basis functions before outputting the result to an integrator 16. The integrator 16 performs the function of digitizing and summing the basis functions from the basis function generator 14 and outputting a reconstructed image to a display 18. Typically, a digital memory and processor system may be used for the integrator 16. The integrator 16 is not required to perform any interpolations or high data-rate accumulations of the image data. The display 18 takes the output from the integrator 16 and places it on a display device 18, such as a video display terminal or photographic film.

The following paragraphs are directed to a discussion regarding the object representation and the generalized Bragg condition. This discussion is not to be taken in a limiting sense, but is made for the purpose of describing the inventor's present understanding of the mathematical theory underlying the operation of the present invention.

The Object Representation. It is known that an object may be represented as a sum of point sources. A TSH system in accordance with the present invention makes use of an equivalent, but alternative, representation of an object. In its preferred embodiment, a TSH system uses a representation of an object as an expansion of spatial basis function components. This representation is somewhat similar to that used to describe a mathematical function by the sum of its Fourier components. As shown in FIG. 2, for example, a two-dimensional rectangle function may be mathematically decomposed into a series of sinusoidal components. In a somewhat similar manner, a three-dimensional object may be mathematically decomposed into its spatial basis function components.

Mathematically, an object T(x) may be expressed as a linear combination of orthogonal basis functions B(x,ξ), defined at every point x in the object and characterized by a set of parameters ξ. (All of the vector quantities used herein are shown in bold-face type. The corresponding magnitudes of the vector quantities are shown in regular type.)

The relationship between an object and the corresponding basis functions may be expressed by the following Equation (1):

$$T(x) = \int_{-\infty}^{\infty} A(\xi)B(x, \xi)d\xi \tag{1}$$

where A represents the amplitude of the basis function. The orthogonality condition of the basis functions may be expressed by the following Equation (2):

$$\int_{-\infty}^{\infty} B(x, \xi')B(x, \xi)dx = \delta(\xi - \xi'). \tag{2}$$

A sensing system in accordance with the present invention performs the function of characterizing the basis functions sequentially over time by measuring the amplitudes A and the parameters ξ of the basis functions. When the basis functions B(x,ξ) are complex sinusoidal waves, the parameters $\xi$ correspond to the spatial frequencies of the basis functions.

For a case in which the sensing process uses light radiation that is scattered by the object, the basis functions may be viewed as components of the optical reflectivity of the object. If the basis functions are chosen to be periodic, then each spatially distributed component may be viewed as a diffraction grating from which the light radiation scatters. Thus, the object may be viewed as a combination of diffraction gratings, and the sensing process may be conceptualized as a process of measuring diffraction from a combination of diffraction gratings.

Different embodiments of the present invention may use different sensing techniques and different sensing geometries. The basis functions may be selected so as to correspond to these different sensing techniques and geometries. For example, as shown in FIG. 3a, if a sensing system in accordance with the present invention radiates plane waves, then the object may be represented by basis functions that are sinusoidal. FIG. 3a illustrates an example in which a laser 22 produces planar wave fronts 24 that create sinusoidal basis functions in the object plane 30. The phase fronts of the sinusoids are illustrated in FIG. 3a by uniformly spaced lines 26.

As shown in FIG. 3b, if the sensing system emits spherical waves from a point source, then the object may be represented by basis functions having curvature. FIG. 3b illustrates an example in which a radio transmitter 32 emits spherical wavefronts 34 that produce curved basis functions 36 on the object plane 40.

The Generalized Bragg Condition. A TSH system in accordance with the present invention uses a sensing system that performs the function of individually measuring the spatial basis function components of an object. The individual measurements of the spatial basis function components of the object obtained by a sensing system may then be used by an ImSyn ™ system to reconstruct an image of the object.

The description of an object outlined above and its physical interpretation in an optical context as a set of diffraction gratings suggests a technique for detecting the individual basis function components of the object. The individual basis function components of the object may be detected by using a Bragg scattering condition.

It will be shown below how the scattering of waves (such as electromagnetic waves, acoustic waves, or other waves) from an object will obey a Bragg scattering condition. It may also be shown that a general Bragg condition may be defined, even if a wave scattering process is not used to sense the object. Further, it will be shown below that a generalized Bragg condition may be derived using the projection slice theorem and assuming that the received sensing signal may be described as a linear response to the transmitted sensing signal.

More specifically, an output signal $S(\xi)$ may be obtained by multiplying the entire object's interaction property $T(x)$ by a basis function $B(x,\xi)$ which describes the sensing input signal and integrating the product over the object to yield $$S(\xi) = \int_{object} T(x)B(x, \xi)dx. \tag{3}$$

In practice, the integral represented by Equation (3) may be performed at different times for each $\xi$. The actual time sequence will depend largely on the practical limitations and the geometry of the sensing apparatus.

By describing the object by its basis function components, a Bragg condition may be obtained. The following steps show how a general Bragg condition follows from the linearity assumption (as expressed in Equation (1)) and the orthogonality condition (as expressed in Equation (2)) of the basis functions. Substituting Equation (1) into Equation (3), we obtain:

$$S(\xi) = \int_{x = object} \int_{\xi' = -\infty}^{\infty} A(\xi')B(x, \xi')B(x, \xi)d\xi'dx \tag{4}$$

Integrating through by x and recalling from Equation (2) that the basis functions, $B(x,\xi)$, are orthogonal in $\xi$, we obtain:

$$S(\xi) = \int_{-\infty}^{\infty} A(\xi')\delta(\xi - \xi')d\xi' \tag{5}$$

$$S(\xi) = A(\xi). \tag{6}$$

Therefore, the detected signal, parameterized by $\xi$, yields the coefficients of the object basis function expansion directly. The image $I(x)$ is obtained from a scaled reconstruction of $T(x)$ using the $A(\xi)$'s and scaled basis functions $B'(x,\xi)$ such that $$I(x) = \int_{-\infty}^{\infty} A(\xi)B'(x, \xi)d\xi. \tag{7}$$

It is believed that a Bragg condition exists for virtually any form of incident radiation and corresponding object basis function. In the following discussion the approximate Bragg condition is derived for the case of an incident plane wave. The case for an incident curved wave that arises in near field sensing geometries is also discussed. Finally, the condition where the sensing process does not consist of wave scattering is also addressed.

Wave Scattering. For a general case of a transmitter 42 and a receiver 44 that are not co-located, as shown for example in FIG. 4, the complex scattered wave amplitude with wave number k may be given by:

$$S(k) = A(r_t, r_r) \int T(r) e^{jk|r_t - r|} e^{jk|r_r - r|} dr \tag{8}$$

where $T(r)$ represents a physical property of the object 50 to be imaged. The coordinates $r_t$ and $r_r$ represent the respective positions of the transmitter 42 and the receiver 44, and r represents the coordinate of a point 46 in the object 50. $A(r_t, r_r)$ is a radial function that describes the $1/r_t$ and $1/r_r$ dependence of the scattering. In this example it is assumed that the magnitudes of $r_t$ and $r_r$ are sufficiently larger than r to take $A(r_t, r_r)$ outside the integral. Equation (8) corresponds to Equation (3) above with $\xi$ being replaced by k and the basis functions being represented by complex wave functions. This sensing system may be referred to as a bi-static system, since the transmitter and receiver are at two different locations.

Figure 5:
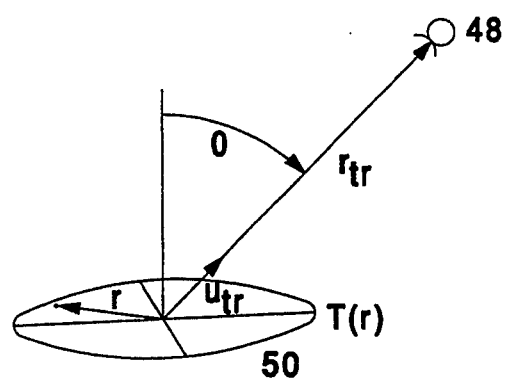
FIG. 5 shows an example of a co-ordinate system for a transmitter and a receiver that are co-located.

If the transmitter and receiver are located at the same point $r_{tr}$ as shown, for example, as transceiver 48 in FIG. 5), then the scattered wave amplitude (Equation (8)) simplifies to:

$$S(k) = A(r_b, r_r) \int T(r) e^{2jk|r_{tr}-r|} dr. \quad (9)$$

This sensing system may be referred to as a monostatic sensing system. In order to easily obtain amplitude and phase information, the signal S(k) may be measured with respect to a reference wave R(k). This reference wave may be real or virtual (e.g., recreated in the sensor electronics). Consider, as a reference, a wave measured with respect to the origin of the object's coordinate system, $r=0$, given by:

$$R(k) = C e^{-2jkr_{tr}} \quad (10)$$

with $r_t = r_r = r_{tr}$ and C representing a constant determined by the sensing geometry.

The received signal therefore becomes S(k) of Equation (9) multiplied by R(k) of Equation (10) yielding:

$$S(k) = A(r_b, r_r) \int T(r) e^{2jk|r_{tr}-r|} e^{-2jkr_{tr}} dr \quad (11)$$

where A has been redefined to incorporate C.

Explicitly evaluating the terms dependent on the r's in the exponent and expanding the square root term to keep only terms linear in r, the exponent may be simplified to:

$$2|r_{tr} - r| - 2 r_{tr} \approx -2 r \cdot u_{tr} \quad (12)$$

where $u_{tr}$ is a unit vector in the direction of the transmitter-receiver 48.

By expressing T(r) as a Fourier integral with object wavenumbers k and evaluating the integral, we find that the only contribution to the received signal S is from waves that have the following frequencies:

$$\kappa r = -2 k \, r \cdot u_{tr} \quad (13)$$

Figure 6A:
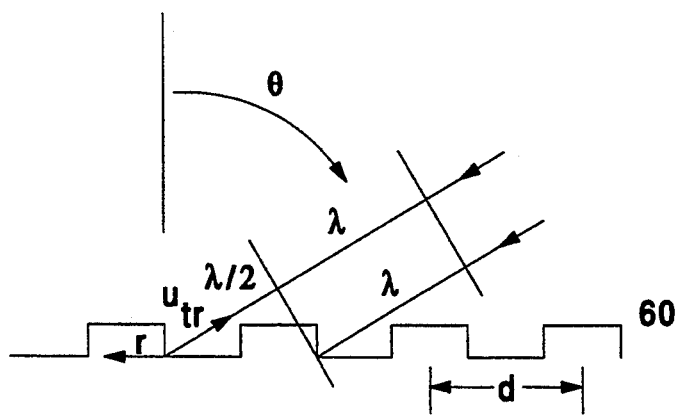
FIG. 6$a$ shows an example of a sensing wave of wavelength $\zeta$ and incident angle $\theta$ scattering from an object whose structure has a period d.

FIG. 6a illustrates a sensing wave of wavelength $\lambda$ and incident angle $\theta$ scattering from an object 60 whose structure has period d. Equation (13) may be expressed in terms of $\lambda$ and d by using $$\kappa = 2\pi/d \quad (14)$$

and $$k = 2\pi/\lambda \quad (15)$$

Figure 6B:
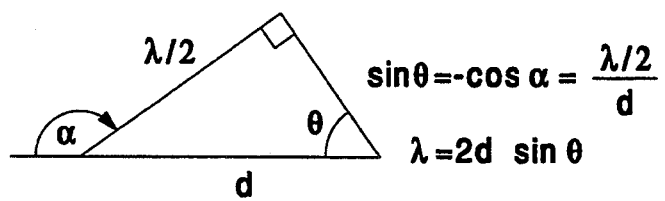

Equation (13) is equivalent to a statement that return waves from object points, separated by the period d, constructively interfere at an incidence angle for which their round trip path differences are multiples of $\lambda$. In FIG. 6a, the one-way path difference between object points separated by the distance d is $\lambda/2$, yielding constructive interference for the round trip. Using the definitions in Equations (14) and (15), Equation (13) reduces to $$\kappa = -2 k \cos \alpha \quad (16)$$

where $\alpha$ is the angle between $u_{tr}$ and r. FIG. 6b displays the relationship between the angle $\alpha$ and the incidence angle $\theta$ of the sensing wave vector relative to the object normal. Since $\alpha$ is equal to $\pi/2$ radians plus the angle $\theta$, Equation (16) reduces to the standard Bragg condition $$\lambda = 2d \sin \theta. \quad (17)$$

The sensing system performs the function of altering Bragg conditions sequentially over time to measure the grating components. In practice, this may be accomplished by changing both the transmitter wavenumber k and position $r_{tr}$.

If the distance between the transceiver 48 and the object 50 becomes small enough so that the plane wave approximation breaks down, a spherical wave Bragg condition becomes applicable. This condition may be derived by evaluating Equation (11) without the approximation of Equation (12). In this case, there will be a Bragg condition that relates the frequency of the radiation and the spatial frequency of a circular grating. This relation may be modified by a condition that relates the respective curvatures of the two waves. The curvature may be characterized by the radius of curvature of the appropriate sphere of constant phase.

If the incident radiation is such that the surfaces of constant phase are neither linear nor spherical, another generalized Bragg condition may be derived. This situation can arise in at least two ways. First, the incident wave fronts may be chosen for experimental reasons to be shaped differently in order to utilize a different set of Bragg conditions. Second, refraction by the transmitting medium may change the geometry of the wave front as it travels to the object. The theoretical treatment of the latter example is more complex than the first, but it is believed that the physics is essentially identical and that a specific Bragg condition may be derived.

Variable Frequency Sensing. In the above discussion, it was shown how scattering a wave of particular frequency from an object measured a spatial component of the object with a spatial frequency characterized by a Bragg condition. If a transmitter emits a wave with a frequency that changes in time, a different type of Bragg condition will result. The general theory will be discussed below, and the general result will then be related to magnetic resonance imaging (MRI). For simplicity, only one spatial dimension will be considered. Assume that the spatial frequency, k, has the linear time dependence $$k = a t \quad (18)$$

where a is a constant of linearity. The transmitted wave, B(x,k), may then be given by $$B(x,k) = e^{-j2\pi a x t}, \quad (19)$$

and the received signal may be given by $$S(k) = \int_{x=-\infty}^{\infty} \int_{k=-\infty}^{\infty} T(x) e^{-j2\pi a x t} dx dk \quad (20)$$

T(x) may be expressed as the Fourier integral $$T(x) = \int_{-\infty}^{\infty} A(k) e^{j2\pi k x} dk \quad (21)$$

Substituting Equation (20) into Equation (21) and integrating over x, results in the temporal signal $$S(k) = \int_{k=-\infty}^{\infty} A(k) \delta(k - at) dk \quad (22)$$

$$= A(at). \tag{23}$$

Physically, this means that, for every time t, one obtains a new basis function amplitude.

Figure 7:
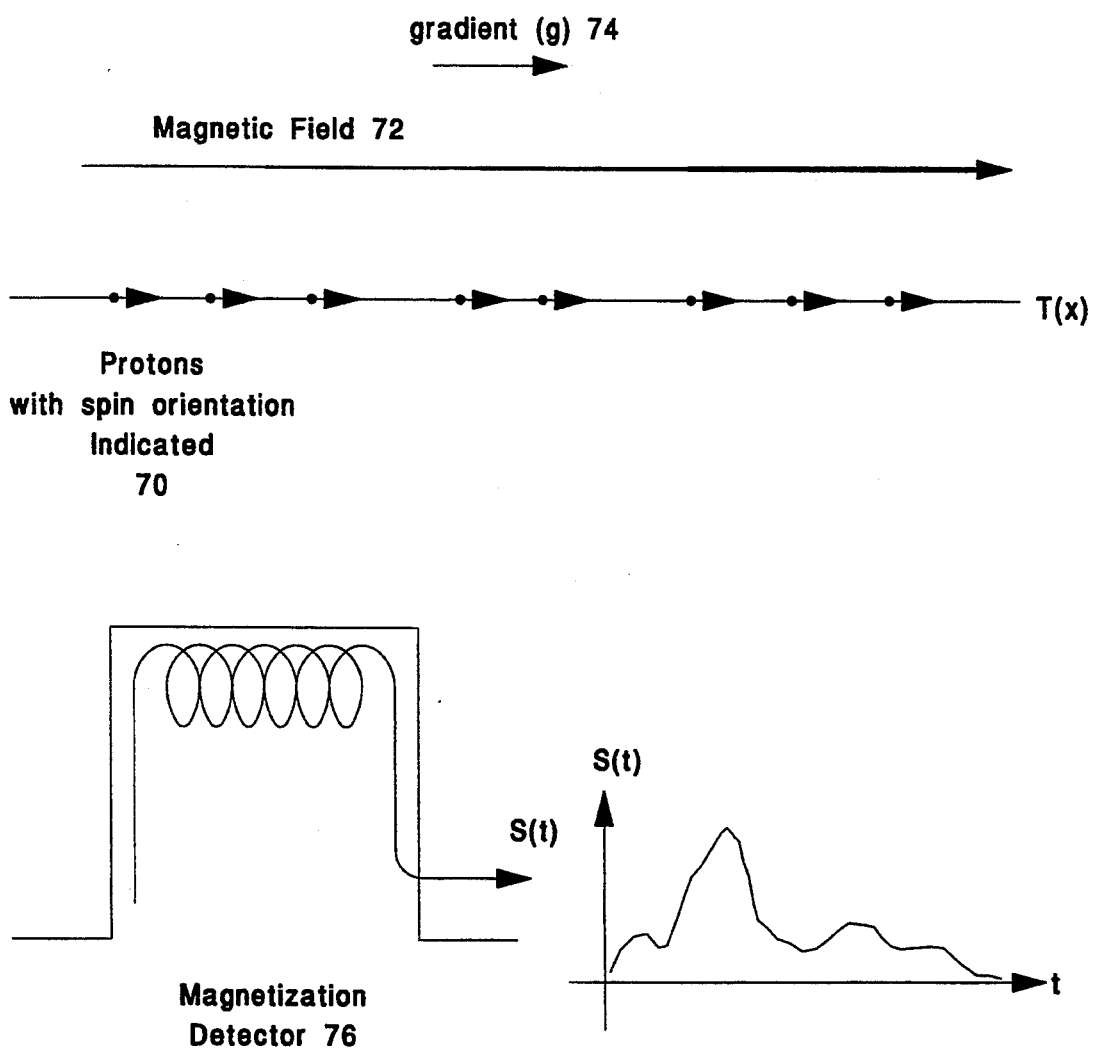
FIG. 7 shows an example of a magnetization detector sensing a one-dimensional distribution of proton spins.

The relationship of Equation (23) may be applied, for example, to MRI. Assume that T(x) is a one-dimensional distribution 70 of proton spins, as shown for example in FIG. 7. In this application, it is assumed that the spins are exposed to a magnetic field 72 with a gradient 74 in the x direction given by g. The spin system may be excited so that the protons begin to precess at their Larmor frequencies. Since each spin is in a field of different strength, each proton will precess at a different Larmor precession frequency. A signal may be obtained by measuring, with a magnetization detector 76, the time dependence of the total magnetization due to all of the spins. For this case it may be shown that:

$$k = \gamma g t \tag{24}$$

where $\gamma$ is the gyromagnetic ratio (4257 Hz/Gauss) for a proton. Assuming a far field approximation, the object basis functions may be given by $$B(x,t) = e^{-2\pi \gamma g x t} \tag{25}$$

Using Equation (23), the output signal of the magnetization detector is $$S(t) = A(\gamma g t). \tag{26}$$

Physically, this means that, for every time t, one obtains a new coefficient for the proton density expansion.

It is important to note that, unlike the wave scattering example described herein, the MRI basis functions are not created by a scattering wave. They are instead created by the magnetic field gradient. The wavelike mathematics results from the sinusoidal precession of the proton which causes a sinusoidal magnetization.

Non-Wave Sensing—Tomography with non-diffracted sources. When an object is sensed by a signal whose wavelength approaches zero, unlike the scattering examples discussed above, it is still possible to extract specific spatial frequency components from the object. An example of this case is x-ray computerized tomography (CT). It will be shown below that by modulating the spatial distribution of the input x-ray beams, a specific spatial frequency component of the object may be measured.

Consider the geometry of tomographic projections as shown, for example, in FIG. 8. A parallel beam geometry is assumed. In current practice, most tomographic data is acquired using a technique known as fan beam projection. However, by a transformation of the data known as rebinning, the more standard fan beam geometry may be expressed as a parallel beam problem. The function $s(p,\phi)$ may be referred to as a projection of an object at orientation $\phi$. The variable p denotes the distance from the origin in the one-dimensional projection, and the angle $\phi$ denotes the rotation of the projection from the x axis. Analogous to Equation (3), the signal $s(p,\phi)$ is given by the line integral $$s(p,\phi) = \int \mu(x) \delta(p - x \cdot n) dx \tag{27}$$

where x is a position vector in Cartesian coordinates, $\mu(x)$ is the x-ray attenuation of the object, and n is the normal vector to the direction of the line integral. A point in the object is defined by its polar coordinates; the angle $\theta$ is the polar coordinate angle of a point in the object, and the magnitude of x is the point's radius.

The one dimensional Fourier transform of $s(p,\phi)$, $S(\nu,\phi)$, may be related to the two dimensional Fourier transform of $\mu(x)$, M(f), by using the projection-slice theorem. The theorem states that the one-dimensional Fourier transform of the projection is equal to the slice of the two dimensional transform of the object evaluated at $f = (\nu,\phi)$. A slice of the two-dimensional object Fourier transform is given by $$S(\nu,\phi) = M(f) \text{ for } f = \nu \text{ and } \theta = \phi \tag{28}$$

where f is the magnitude of f. If the x-ray beams are modulated by a complex sinusoid with frequency $\nu_o$, then Equation (27) becomes $$s(p,\phi) = \int \mu(x) e^{j2\pi \nu_o p} \delta(p - x \cdot n) dx. \tag{29}$$

The projection slice theorem then indicates that the slice be evaluated at $\nu + \nu_o$ instead of at $\nu$, such that $$f = \nu + \nu_o \text{ and } \theta = \phi \tag{30}$$

In order to derive the Bragg condition, the one-dimensional Fourier transform of the modulated signal, s, is evaluated at zero frequency. The Fourier transform of $s(p,\phi)$ is given by:

$$S(\nu,\phi) = \int s(p,\phi) e^{-j2\pi \nu p} dp. \tag{31}$$

Evaluating $S(\nu,\phi)$ at $\nu=0$, we obtain:

$$S(0,\phi) = \int s(p,\phi) dp. \tag{32}$$

That is, by integrating the projected data, we obtain the zero frequency component of the signal. Using Equation (30), we obtain the spatial frequency component of the object at $$f = \nu_o. \tag{33}$$

Thus, modulating the beams with a sinusoid of frequency $\nu_o$ measures the spatial frequency component equal to $\nu_o$ in the direction n normal to the x-ray projections.

The process of obtaining the phase of a spatial frequency component in the case of CT scanning is somewhat different than in the wave scattering example above. In the wave scattering example, a reference phase is subtracted from the scattered wave in the controller. In the case of CT, the phase of a spatial frequency component is obtained from a pair of measurements consisting of modulated x-ray patterns of the same spatial frequency but phase shifted by $\pi/2$ radians with respect to one another.

In standard CT, the x-rays are not modulated. Consequently, the projection contains all the spatial frequency components in the n direction. To extract each spatial frequency component, the detected signals of the projections may be electronically stored and individually modulated as needed using a microprocessor.

The two examples above illustrate the principles upon which sensing systems may be designed so that they generate the required information for a TSH system. In each case, the mathematics indicates how the amplitude and phase of a spatial Fourier component of the object may be measured. These measurements may then be used by an ImSyn TM system to perform the image reconstruction.

Tomography with Diffracted Sources. The discussion above pertained to tomography with objects that do not diffract the transmitted signal. The TSH concept is equally applicable to the case of mono-frequency signals that are diffracted by the object. Reference is made to Kak (A.C. Kak, Tomographic Imaging With Diffracting and Nondiffracting Sources, *Array Signal Processing*, S. Haykin, ed., Prentice Hall, Inc., Englewood Cliffs, N.J., 1985) for a discussion of the mathematics required to treat such a case. This type of sensing is based upon a theorem for diffracted sources that is related to the projection slice theorem discussed above. The theorem relates the Fourier transform of the projection of the signal through the object, that is the forward scattered amplitude, to the two-dimensional Fourier components of the object.

In the case of non-diffracting sources, the transform of the projection falls along a linear slice out of the object's two-dimensional transform space. For diffracting sources, the theorem shows that the transform of the projection falls along a circular arc in the object's transform space.

Knowledge of the amplitude and phase and of the position of these frequency components constitutes a Bragg condition from which the image reconstruction can take place.

Sensing System Methods. A sensing system in accordance with the present invention performs the function of outputting basis function parameters that may be used by an ImSyn TM system to reconstruct an image of an object. Typically, the basis function parameters will comprise the amplitude, phase, and spatial frequency of an object's basis function. Different parameters may be used if the object's basis function is non-sinusoidal.

In known holographic techniques, amplitude and phase information may be obtained by simultaneously interfering a received wave and a reference wave of constant frequency and phase on a recording medium. In the present invention, the technique for obtaining amplitude and phase information may differ from such known holographic techniques in at least several respects. For example, in the present invention, in contrast to known holographic techniques, the recording of each basis function does not need to occur simultaneously. Moreover, in the present invention, in contrast to known holographic techniques, the waves are not required to be mutually coherent.

There are at least three alternative methods of sensing an object's basis functions that may be used in practicing the present invention. Each of these three alternative sensing methods is described below. A primary distinction among these three alternative sensing methods is the manner in which the amplitude and the phase of the object's basis functions are measured. The three alternative sensing methods described below may be used in conjunction with any of the ImSyn TM systems discussed herein.

First Alternative Sensing Method. A first alternative sensing method may be employed when the signal transmitted by a transmitter comprises a travelling wave, such as an electromagnetic radiation wave or an acoustical wave. The first alternative sensing method may be used, for example, when the sensing system utilizes a radio transmitter for transmitting radio waves. The first alternative sensing method may also be used whenever the phase of the transmitted wave may be accurately controlled, regardless of whether the wave is or is not an electromagnetic wave.

The first alternative sensing method comprises electronically interfering the waves received from an object to be imaged with a corresponding set of electronic representations of reference waves emitted from a fixed point (e.g. the origin of the coordinate system). The spatial frequency of the reference waves will vary with the relative position of the transmitter. However, the phase of the reference waves will remain fixed with respect to the fixed point. The phase of the received waves may then be determined by analyzing the interference signal.

Figure 9A:
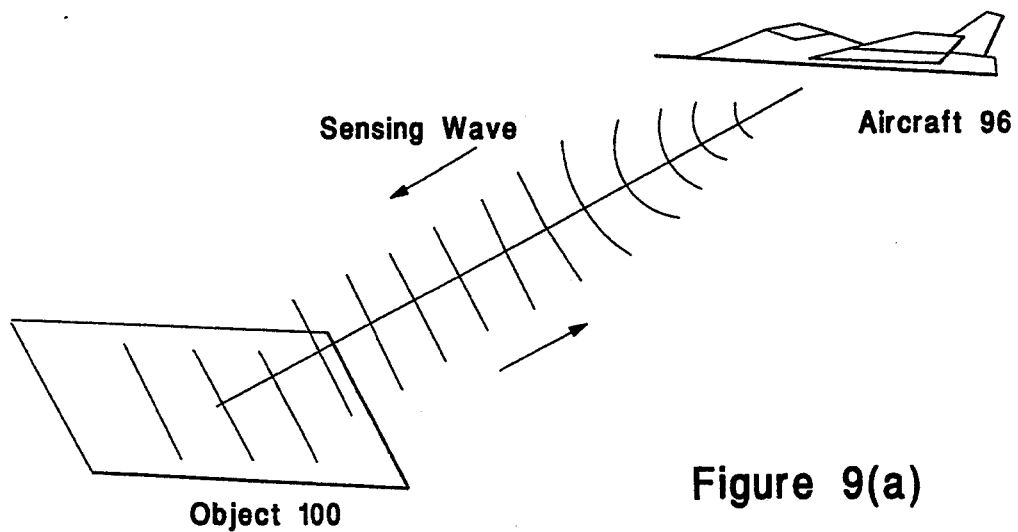
FIGS. 9$a$ and 9$b$ show an example of how a first alternative sensing method may be used in a Synthetic Aperture Radar or "SAR" system.
Figure 9B:
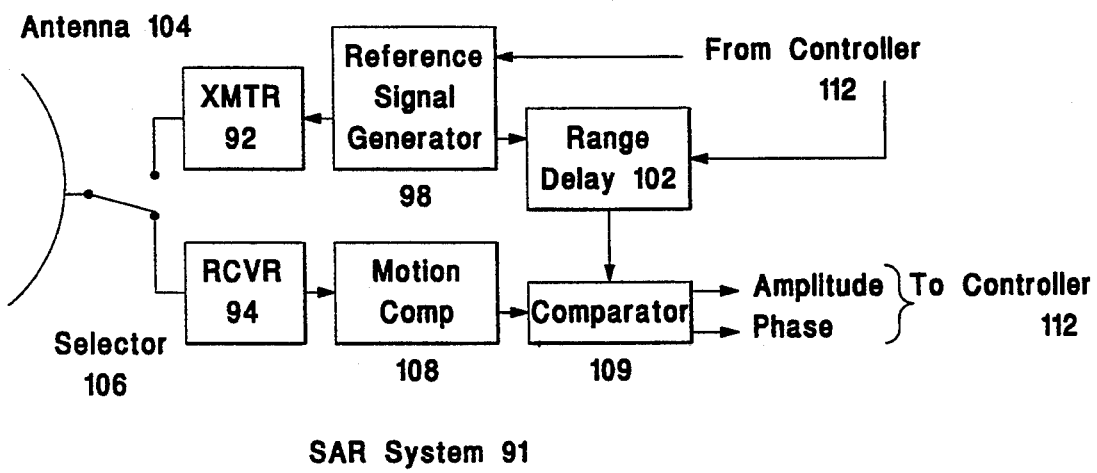

FIGS. 9a and 9b illustrate an example of how the first alternative sensing method may be used in a Synthetic Aperture Radar or "SAR" system. In the illustrated SAR system 91, the transmitter 92 and the receiver 94 comprise a radar set mounted on a flying aircraft 96. The receiver 94 includes electronic components for determining the phase of a return signal with respect to a reference wave. The SAR system 91 is carried by the aircraft 96 some distance (or range) away from an object 100.

In the SAR system example illustrated in FIG. 9b, the sensing process proceeds as follows: The controller (not illustrated) initiates a signal pulse to be produced by a reference signal generator 98. The frequency of the signal pulse may be pre-programmed into the reference signal generator 98, or alternatively it may be determined by the controller itself. A delayed copy of the signal generated by the reference signal generator 98 is also produced by a range delay module 102. The length of the delay is equal to the length of the round trip propagation time of the sensing wave to the center of the coordinate system.

The original signal pulse is amplified and emitted by a transmitter 92 and an antenna 104 over time. The pulse propagates to the object and is reflected back to the antenna 104 by the spatial component of the object 100 which satisfies the Bragg condition with respect to the sensing radar wave. The reflected radar wave is captured by the antenna 104 and the receiver 94. (A selector 106 may be used to select the times during which the antenna is used for transmitting and the times during which the antenna is used for receiving.) A motion compensator 108 may optionally be used to correct the return signal output of the receiver 94 for effects caused by the motion of the aircraft 96. A comparator 109 then compares the corrected return signal with the range-delayed transmitted signal from the range delay module 102. Based upon this comparison, the comparator 109 produces output signals corresponding to the amplitude and to the phase of the measured basis function. These amplitude and phase signals are then passed to the controller for processing by an ImSyn TM system.

The frequency of the radio waves emitted by the antenna 104 is known to the controller 112. The position of the transmitter 92 relative to the object 100 is also known by the controller 112. The controller's knowledge enables the controller to determine the direction of the radio wave propagation and therefore the radio wave's spatial frequency and the Bragg-matched spatial frequency of the object 100. The radio wave's spatial frequency and the amplitude and phase of the return signal after the comparator 109 are used by the ImSyn TM system to reconstruct a component of the object's image.

In a variation of the first alternative sensing method, a time dependence may be introduced to the spatial frequency of the transmitted wave. One way of introducing a time dependence to the spatial frequency of the transmitted wave is to "chirp" the transmitted wave, thereby introducing a linear time dependence to the spatial frequency. The parameter $\xi$ of the basis function amplitude $A(\xi)$ will then have a time dependence. The Bragg condition will then cause the basis functions to be transmitted sequentially over time by the system. This variation of the first alternative sensing method may be used, for example, in magnetic resonance imaging (MRI). Another example of this method is a SAR system in which the signal pulses are linearly frequency modulated, or chirped.

Figure 10:
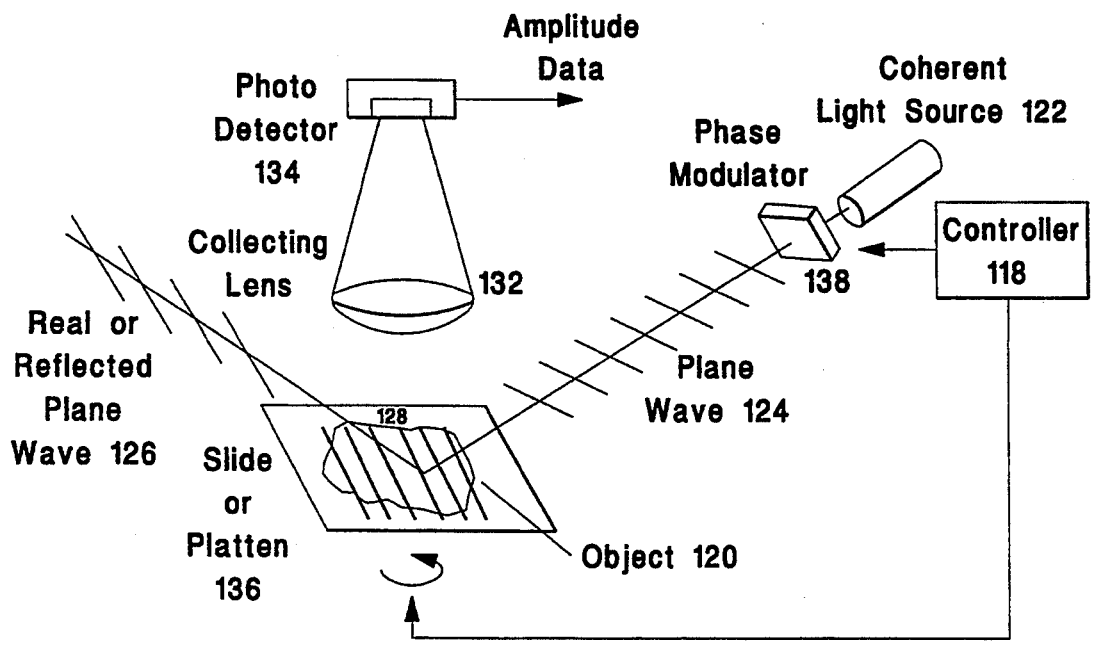
FIG. 10 shows an example of a second alternative sensing method.

Second Alternative Sensing Method. A second alternative sensing method comprises creating a set of fringes on the object by interfering a reference wave and a transmitted wave on the object and measuring the scattered amplitude. FIG. 10 illustrates an example of the second alternative sensing method using optical radiation. It is recognized, however, that the second alternative sensing method may be used with any form of coherent wave radiation and is not limited to optical radiation.

The transmitter comprises a coherent light source 122 emitting a plane wave 124. A second plane wave 126 may be produced either by a source coherent with the first or by a reflection of the first wave 129. The interference of the two plane waves on the object 120 produces a set of uniformly spaced two-dimensional sinusoids referred to as fringes. The sinusoidal phase fronts are depicted as lines 128 in FIG. 10. The receiver is a radiometer comprising a collecting lens 132 and a photodetector 134.

In the example of the second alternative sensing method illustrated in FIG. 10, the controller 118 is used to control the position of the object 120 relative to a transmitter and a receiver, so that the spatial frequency of fringes on the object may be varied. For example, the object 120 may be placed on a rotating platform 136, rotation of which is determined by the controller 118. The controller 118 also controls and monitors the angle at which the transmitted wave 124 and the reference wave 126 interfere on the object 120. A phase modulator 138 may be controlled by the controller 118 to set the phase of the fringes 128 on the object 120.

The amplitude of the object's basis function may be obtained by passing light scattered by the object through a collecting lens 132 onto a photodetector 134. The photodetector 134 produces a signal that is proportional to the intensity of the scattered light. The amplitude and the phase of the object component may be obtained from a pair of intensity measurements, where the two sets of fringes projected on the object are out of phase by $\pi/2$ radians.

As in the first alternative sensing method, the Bragg condition assures sensing of a particular frequency component of the object.

In a variation of the second alternative sensing method, the relative magnitude of the temporal frequencies of the two light beams may be varied. This variation creates a travelling fringe pattern on the object. A method bearing some similarities to this variation of the second alternative sensing method is utilized in U.S. Pat. No. 4,584,484 to measure Fourier components of objects in a microscopy application.

A Third Alternative Sensing Method. Both the first and second alternative sensing methods described above depend upon the wave properties of the sensing fields. In both the first and second alternative sensing methods, basis function patterns are created or measured by interfering two waves. A third alternative sensing method allows sensing of objects without exploiting the wave nature of the transmitted radiation. As discussed herein with respect to Non-Wave Sensing, the amplitude and the phase of components of the object may still be obtained even when a sensing system does not employ a wave. CT and other ionizing radiation-based tomographic applications may utilize this third alternative sensing method.

Figure 11:
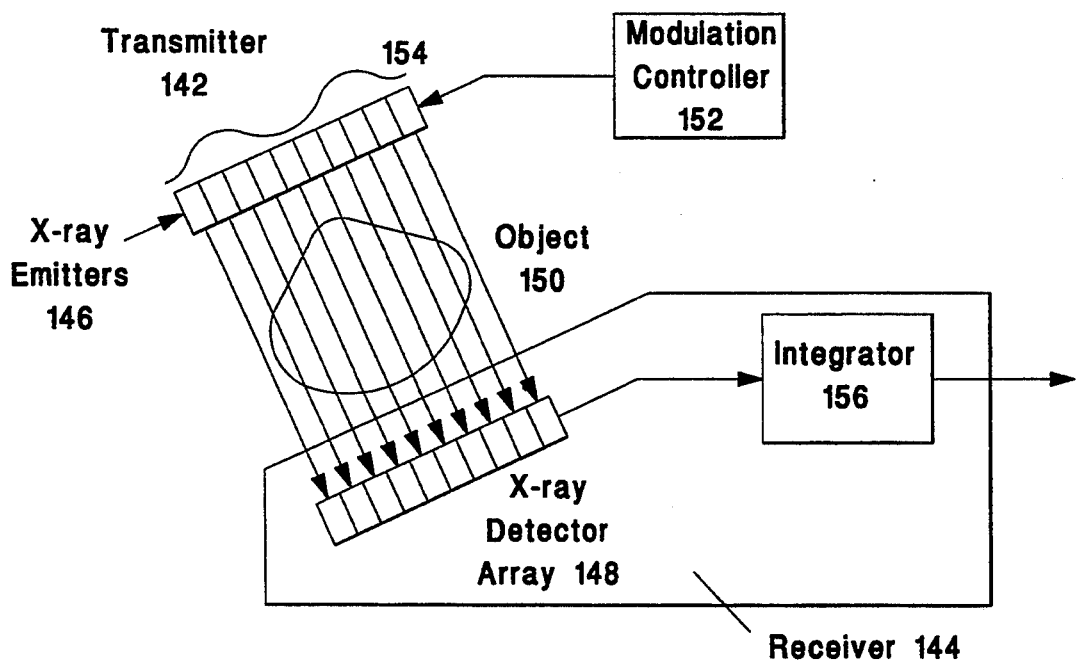
FIG. 11 shows an example of a third alternative sensing method.

FIG. 11 illustrates an example of the third alternative sensing method with respect to a parallel beam CT system. The system shown in FIG. 11 comprises a set of x-ray emitters 146 (which are identified collectively as a transmitter 142), a set of x-ray detectors 148 and an integrator 156 (which are identified collectively as a receiver 144). The x-ray emitters 146 may be spatially modulated by a controller 152 to create a wave form 154 or other basis function in x-ray intensity. The amplitude and the phase of the object basis function may be obtained, as in the second alternative sensing method, from two separate modulations of x-ray intensity that are out of phase by $\pi/2$ radians. Alternatively, the direct modulation of the x-rays may be replaced by a Fourier analysis of the detected signal before the integrator 156. This alternative provides direct amplitude and phase data on all Fourier components of the tomographic projection.

Operation of the Image Synthesis System. An ImSyn ™ system in accordance with the present invention performs the function of reconstructing images from scaled copies of two-dimensional basis functions. The two-dimensional basis functions may comprise sinusoids or segments of rotationally symmetric Fresnel functions. As shown in FIG. 1 with respect to a preferred embodiment, the ImSyn ™ system may reconstruct the basis functions using an optical basis function generator 14 controlled by a controller 12.

In the embodiment of the ImSyn ™ system illustrated in FIG. 1, a basis function may be generated by inputting signals from the controller 12 corresponding to the following five parameters: the amplitude and the phase of the basis function, the spatial frequencies $f_x$ and $f_y$ of the basis function, and a displacement $\epsilon$ to set the wavefront curvature of the basis function. The controller 12 may manipulate these parameters and then pass a signal corresponding to the manipulated parameters to the optical basis function generator 14. The optical basis function generator 14 may then create a scaled version of the object basis function based upon the signals from the controller 12.

The ImSyn ™ system may recreate the basis functions by generating and interfering two optical point sources. Any of several different techniques may be used to create a real or virtual pair of coherent point sources which interfere on a photosensor. The theory supporting the control of two point sources is discussed generally in the paragraphs immediately below. Following that, an example of an optical implementation of the point source generation is discussed.

FIG. 12 illustrates an example of a relatively simplified method for generating a basis function on a photosensor. As shown in FIG. 12, a pair of focusing lenses 162 is located in a first plane P0, referred to herein as the focusing plane P0. The pair of focusing lenses 162 focus collimated beams of laser light to two distinct points 162 located in a second plane P1, referred to herein as the frequency plane P1. A transform lens 166 is positioned so that its principal planes coincide with a third plane P2, referred to herein as the lens plane P2. The transform lens 166 Fourier transforms the light from the pair of point sources into sinusoidal interference fringes 168 in a fourth plane P3, referred to herein as the image plane P3. In order for the transform lens 166 in the lens plane P2 to perform a Fourier transform of the light distribution in the frequency plane P1, the separation between the frequency plane P1 and the lens plane P2 and the separation between the lens plane P2 and image plane P3 must each be equal to the focal length f of the transform lens 166. The image components in the image plane P3 are synthesized by a two-dimensional Fourier transform of the points 164 in the frequency plane P1.

If an ImSyn TM system generates basis functions that are rectilinear, then each such rectilinear basis function may be defined by the magnitude and the orientation of a spatial frequency vector. The magnitude of the spatial frequency vector may be represented by the separation between the point sources 164 in the frequency plane P1. The direction of the spatial frequency vector may be represented by the angle made with the x-axis by a vector connecting the two point sources 164 in the frequency plane P1.

FIG. 13 illustrates a relationship between the point source separation in the frequency plane P1 and the spatial frequency components in the image plane P3. If the point sources are parallel to the x-axis, they will produce fringes having a phase front normal that is parallel to the x-axis. If the point sources are inclined at an angle of $\pi/4$ radians with respect to the x-axis, then they will produce fringes having a phase front normal that is tilted with respect to the x-axis by $\pi/4$ radians. The smaller the separation between the point sources in the frequency plane P1, the lower the spatial frequency in the image plane P3. In other words, the smaller the separation between the point sources in the frequency plane P1, the greater the spacing between the fringes in the image plane P3. A phase shift in one beam (which phase shift may be caused by a phase control device 172 as shown in FIG. 12) results in the interference pattern shown in FIG. 13 shifting in the direction of the depicted spatial frequency vectors (normal to phase fronts).

Figure 14:
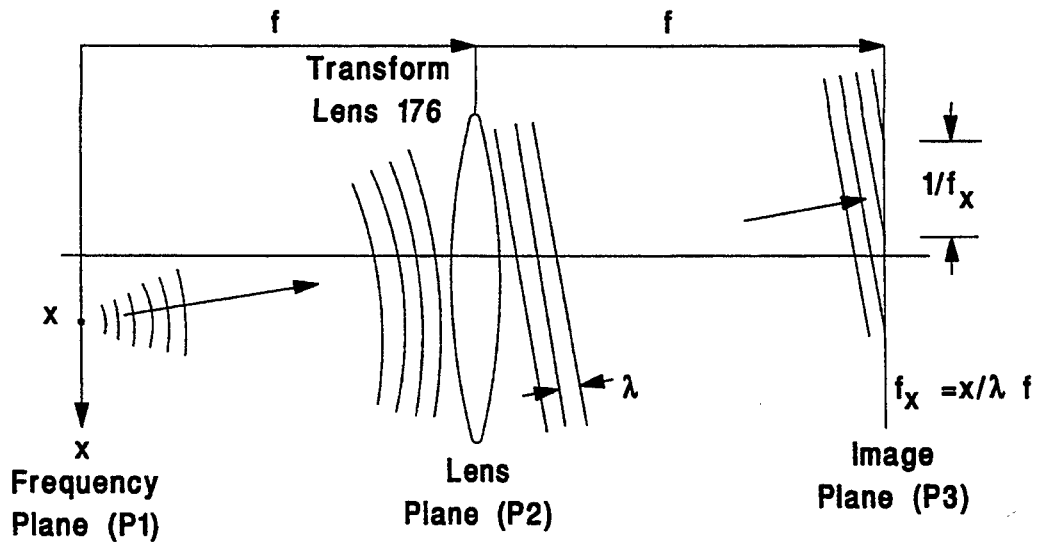
FIG. 14 shows an example of the relationship between the location of a point source in the frequency plane and the spatial frequency of the plane wave it generates.

FIG. 14 illustrates an example of the relationship between the location of a point source in the frequency plane P1 and the spatial frequency of the plane wave it generates. The two point sources in the frequency plane P1 have coordinates $(x_1,y_1)$ and $(x_2,y_2)$, respectively. Each point source in the frequency plane P1 creates a spherical wave emanating towards a transform lens 176 in the lens plane P2. The lens plane P2 is one focal length f from the frequency plane P1. The transform lens 176 collimates the spherical waves to create plane waves. The plane waves propagate at angles that are defined by the position of the point sources with respect to the axis of the transform lens 176. The action of the transform lens 176 may be viewed as creating a virtual point source at infinity, since plane waves emanate from the lens.

The two plane waves interfere in the image plane P3. The image plane P3 is one focal length f from the transform plane P2.

An array of photosensing elements (e.g., a charge-coupled device (CCD)) may be arranged in the image plane P3, so that the two plane waves interfere on the array of photosensing elements.

The vector components of the two plane wave spatial frequencies are given by:

$$f_{1x} = \frac{x_1}{\lambda f}, f_{1y} = \frac{y_1}{\lambda f}, \qquad (34)$$

$$f_{2x} = \frac{x_2}{\lambda f}, f_{2y} = \frac{y_2}{\lambda f}, \qquad (35)$$

where $f_1$ and $f_2$ refer to the spatial frequency in the image plane P3 of the first and second point sources, respectively, and $\lambda$ is the wavelength of the optical sources.

If a point source is located on the axis of the transform lens 176, then the spatial frequencies of the point source are zero, indicating that the plane wave travels normal to the photodetector. If the point source is not located on the axis of the transform lens, then the plane wave is oriented at an angle with respect to the axis of the transform lens. The angle is proportional to the distance of the point source from the axis of the transform lens 176.

The controller 12 performs the function of modulating the two point sources such that they have equal amplitudes. The phase $\phi$ of the basis function may be represented by the relative optical phase of the two point sources. When the two point sources 164 are located in the frequency plane P1, their plane waves interfere on the photodetector in the image plane P3 to create a fringe pattern 168 given by $$I(x,y) = |a e^{j2\pi(f_{1x}x + f_{1y}y)} e^{j\phi} + a e^{j2\pi(f_{2x}x + f_{2y}y)}|^2 \qquad (36)$$

where $a$ represents the intensity of both point sources 164, set to the square root of half the object basis function amplitude A, and $\phi$ represents the relative phase difference between the two point sources 164. Substituting Equations (34) and (35) into Equation (36) and evaluating, we obtain $$I(x, y) = A \left\{ 1 + \cos\left[ \frac{2\pi\{x(x_1 - x_2) + y(y_1 - y_2)\}}{\lambda f} + \phi \right] \right\} \qquad (37)$$

This may be seen to be a two-dimensional sinusoidal wave pattern with an amplitude that is proportional to A. The sinusoid is on a constant bias equal to the basis function amplitude. The phase $\phi$ gives the phase of the sinusoid relative to the center of the coordinate system. The spatial frequency of the basis function is proportional to the separation of the point sources, and the angle that the phase front normal makes with the x-axis is the angle between the x-axis and the point $(x_1-x_2, y_1-y_2)$.

If an ImSyn TM system generates basis functions that are spherical, then each such spherical basis function may be defined by a wavefront curvature as well as the magnitude and the orientation of a spatial frequency vector. The spatial frequency vector may be determined by the point source separation and orientation, in the manner described above. The curvature of the fringes may be related to a defocusing of one or both of the point sources out of the frequency plane P1.

Figure 15:
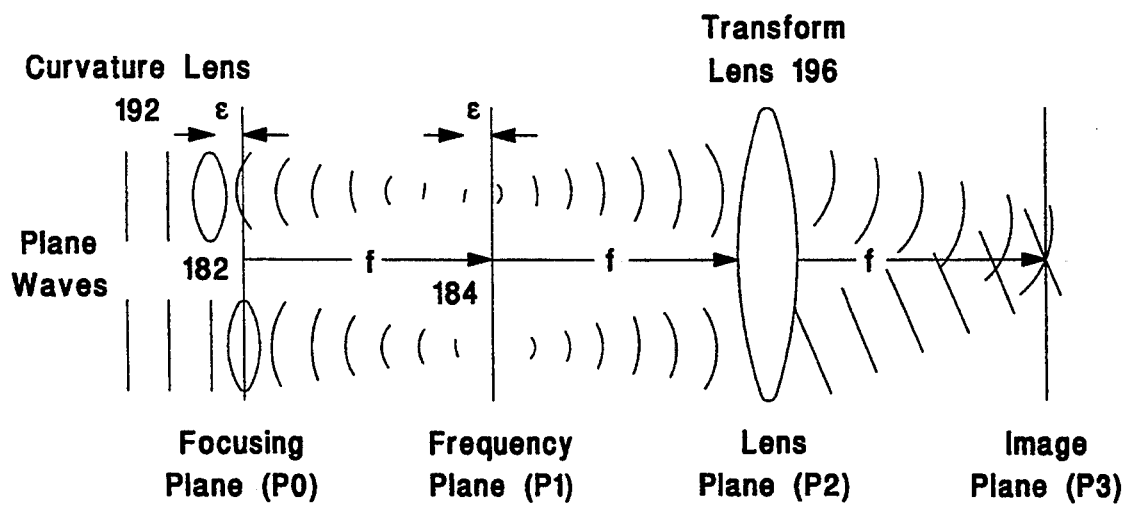
FIG. 15 shows an example of the generation of curved basis functions.

FIG. 15 illustrates an example of the generation of curved basis functions. By way of comparison, FIG. 12 illustrates an example of two lenses 182 in the focusing plane P0 that focus plane waves of laser light into a pair of point sources 184 in the frequency plane P1. In the example shown in FIG. 15, one lens focuses a plane wave to a point source in the frequency plane P1. The other lens 192, referred to herein as a curvature lens, is axially displaced a distance ε from the focusing plane P0 so that the curvature lens 192 focuses the light to a point source that is a distance ε from in the frequency plane P1. In the lower beam shown in FIG. 15, the transform lens 192 in the transform plane P2 produces a plane wave from the source located in the frequency plane P1. In the upper beam shown in FIG. 15, the point source is not located in the frequency plane P1. Consequently, the transform lens 196 does not produce a plane wave. Instead, the transform lens 196 produces a spherical wave with curvature defined by the displacement ε.

A spherical basis function results from the interference in the image plane P3 of the plane wave in the lower beam and the spherical wave in the upper beam. The basis function recorded by a photosensor in the image plane P3 is a segment of a rotationally symmetric Fresnel function, the interference of a plane wave and a spherical wave.

The following is a description of how the displacement of the curvature lens 192 may be related to the radius of curvature of a spherical wave produced by the transform lens. This relationship may be derived analytically in the paraxial approximation from the well-known lens-maker's law $$\frac{1}{q_1} + \frac{1}{q_2} = \frac{1}{f} \qquad (38)$$

where $q_1$ represents the distance of a point source from the lens plane P2, and $q_2$ represents the position of a virtual image point. If it is assumed that the point source is displaced a small distance ε normal to the frequency plane P1, as in FIG. 15, then the distance from the point source to the lens plane P2 is given by the equation $q_1 = f + \varepsilon$. Solving for the virtual image distance $q_2$, we find that $q_2$ is given by $$q_2 = \frac{f^2}{\varepsilon} + f \qquad (39)$$

Equation (39) thus shows that if the source is moved out of the frequency plane P1 by a small distance ε, then a virtual point source is created at a distance $f^2/\varepsilon$ from the image plane P3. When ε is zero, the virtual point source is infinitely far from the image plane P3 and a plane wave results. When ε is nonzero, the virtual point source is at a finite distance and a spherical wave results. Therefore, a sensing wave emanating from a point-like transmitter may be reconstructed in the ImSyn ™ by moving the curvature lens such that $f^2/\varepsilon$ is proportional to the distance from the transmitter to the object. The constant of proportionality is the ratio of the sensing wavelength to the optical wavelength of the ImSyn ™ system. When the sensing wavelength varies, either the displacement of the curvature lens or the ImSyn ™ optical wavelength must vary, too.

In some applications of the ImSyn ™, the introduction of curvature requires an additional degree of freedom for the curvature lens. These cases include scenarios where the sensing angle is not nearly normal to the object and the transmitter is not far enough from the object to approximate the sensing waves as planar or nearly planar waves. In such cases, the wavefront curvature is different in the two dimensions. To incorporate the second degree of curvature, the curvature lens may be tilted slightly, as well as be displaced along the optical axis. Alternatively, the curvature lens may comprise a pair of orthogonal, cylindrical zoom lenses.

Figure 16:
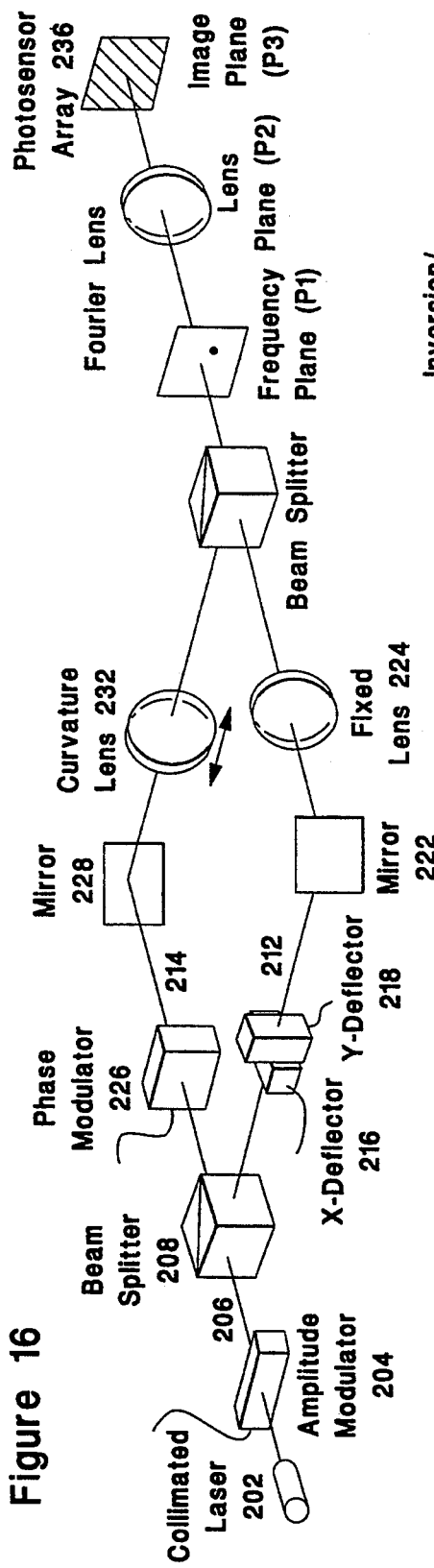
FIG. 16 shows an example of a basis function generator based on an optical Mach-Zehnder interferometer.
Figure 17:
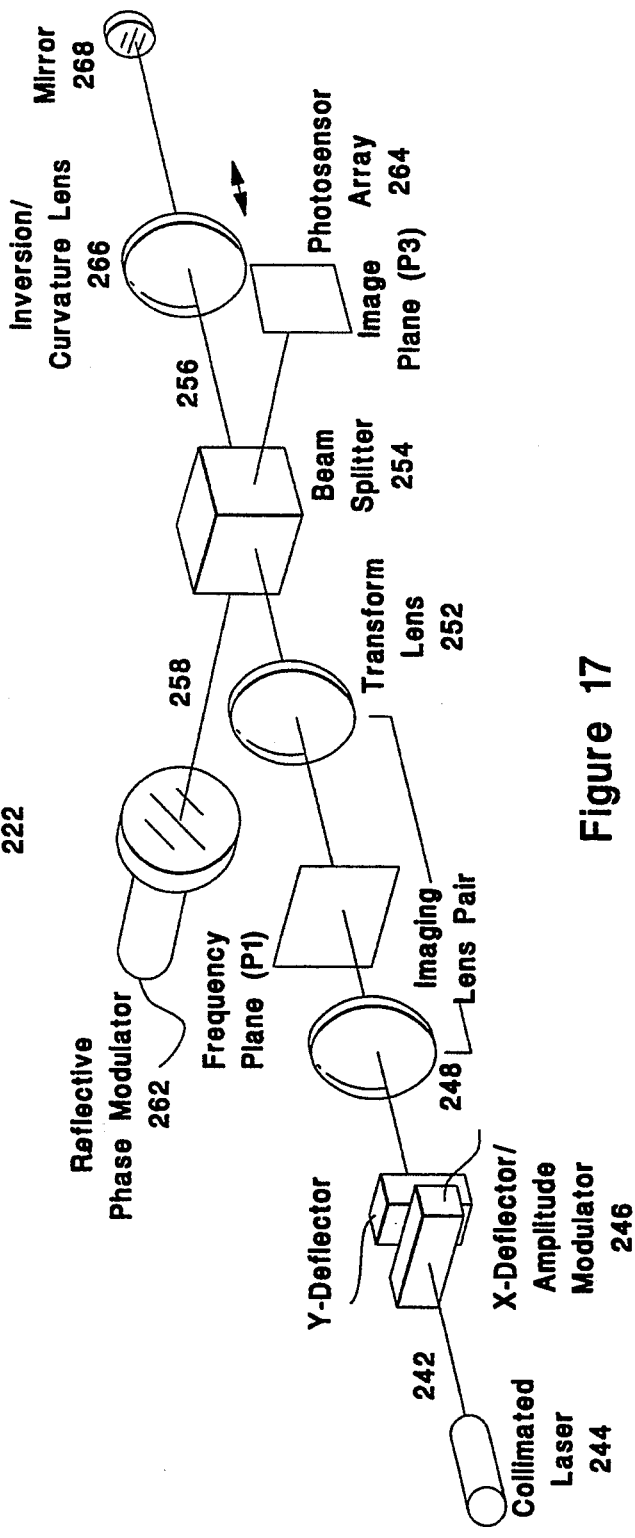
FIG. 17 shows an example of an image synthesis approach based on a Twyman-Green, or Michaelson, interferometer.

FIGS. 16 and 17 illustrate two examples of basis function generators of an ImSyn ™ system.

FIG. 16 depicts an example of a basis function generator based on an optical Mach-Zehnder interferometer. The amplitude of a collimated laser light source 202 is modulated by an amplitude modulator 204, corresponding to the root amplitude α of the basis function. The modulated beam 206 is then divided by a beam splitter 208 into a first beam 212 and a second beam 214.

The first beam 212 is deflected in the x and y directions by an x-deflector 216 and a y-deflector 218. In practice, these deflectors may comprise mechanically controlled mirrors, acousto-optic devices, or electro-optic devices. The deflected first beam 212 is then reflected from a mirror 222 and passed through a fixed lens 224 which focuses the first beam 212 to a point in the frequency plane P1. This results in a point source in the frequency plane P1 whose amplitude and x-y position in the plane may be changed by a controller that drives the amplitude modulator and x- and y-deflectors. The magnitude and the direction of the spatial frequencies of the basis functions may thereby be controlled.

The second beam 214 is passed through a phase modulator 226 that is driven by the controller. The second beam is then reflected from a mirror 228 and passed through a curvature lens 232 whose position is mechanically controlled by the controller. By moving the curvature lens 232 along the optical axis of the second beam, the second beam 214 may be focused to an on-axis point in the frequency plane P1 or out of the frequency plane P1 to vary the curvature of the basis functions. The components in the second beam thus control the phase and the curvature of the basis function.

The two point sources produced in the frequency plane P1 interfere as described above and form basis function fringes in the image plane P3. The optical intensity at the image plane P3 may be detected on a photosensor array 236, such as a charge-coupled device (CCD).

FIG. 17 depicts an example of a basis function generator based on a Twyman-Green, or Michaelson, interferometer. The functionality of this interferometric design is the same as the Mach-Zehnder approach described above. However, one of the point sources in the frequency plane P1 is virtual instead of real (as in the Mach-Zehnder approach). In the example shown in FIG. 17, there is no plane in which the two point sources exist together.

As shown in FIG. 17, a beam 242 from a collimated light source 244 is passed through an x-y deflector and amplitude modulator assembly 246. The x-y deflector and amplitude modulator assembly 246 may comprise a set of mechanically tiltable mirrors, acousto-optic devices, or electro-optic devices. The x-y deflector and amplitude modulator assembly 246 may include direct amplitude modulation of the laser. The controller 12 drives the x-y deflector and amplitude modulator assembly 246 with signals that set the amplitude and the spatial frequency of the reconstructed basis functions. The resultant plane wave is focused onto the frequency plane P1 by a lens 248 and recollimated by a Fourier transform lens 252. The beam that exits the Fourier transform lens 252 comprises a plane wave travelling at an angle determined by the x-y deflector 246. The beam is then split by a beam splitter 254 into a first beam 256 and a second beam 258.

The second beam 258 goes to a reflective phase modulator 262 that is driven by the controller. A small displacement of the reflective phase modulator 262 along the optical axis of the second beam imparts a phase change to the second beam 258. The second beam 258 is reflected by the reflective phase modulator 262, is passed through the beam splitter 254 a second time, and is projected onto the photosensor array 264 at the image plane P3.

The first beam 256 passes through an inversion/curvature lens 266 and is reflected by a mirror 268. The lens/mirror combination acts as an inverting imaging system. The lens 266 may be mechanically translated along the optical axis of the first beam by the controller 12. The mechanical translation of the lens 266 creates wavefront curvature in the first beam 256. When the lens 266 is positioned one focal length away from the mirror 268, the lens/mirror combination forms an afocal imaging system having a magnification of $-1$. The wave exiting the lens/mirror combination has a tilt which appears to emanate from a virtual source diametrically opposite the point source in the frequency plane P1. The first beam is reflected by the beam splitter 254 onto the photosensor array 264 in the image plane P3, where the first beam 256 interferes with the second beam 258. The resulting basis function has an amplitude and a spatial frequency determined by the x-y deflector 246, a phase determined by the reflective phase modulator 262, and a curvature controlled by the inversion/curvature lens system 266.

In general, TSH sensing systems have geometries that do not naturally generate spatial frequency data that fall on regularly spaced intervals in a rectangular coordinate system. Most of the examples discussed herein (e.g., SAR and CT) generate frequency plane data specified by polar coordinates. The sequence of positions of the point sources in the frequency plane P1 therefore will not fall onto regular intervals in a rectangular coordinate system.

This fact, however, is entirely transparent to the ImSyn TM system. The system may process data from any point in the frequency plane by scanning the position of the sources with x-deflection and y-deflection of the optical beams. This feature is referred to herein as scan conversion, because this feature enables the ImSyn TM controller, with a relatively few simple computations, to convert non-rectangular frequency data to the rectangular coordinates of the x-deflector and y-deflector.

Multi-Frequency TSH Embodiment. The following paragraphs describe an embodiment of the invention referred to herein as multi-frequency TSH. In multi-frequency TSH, basis functions are not reconstructed individually on an image plane. Instead, the Fourier space representation of an object is fully synthesized first, and then Fourier transformed to produce an image of the sensed object. All Fourier amplitudes are recorded sequentially on a photosensor array in the frequency plane, and only then is the frequency data transformed in two dimensions to produce an image. A multi-frequency embodiment of a TSH system performs functions similar to those performed by the ImSyn TM systems discussed above, but performs such functions in a different time sequence. This approach is a form of TSH because an image is synthesized from the complex amplitudes and spatial frequencies of object basis functions, as in the ImSyn TM systems discussed above.

Conceptually, multi-frequency TSH may be thought of as breaking the ImSyn TM system in half at the frequency plane P1. Instead of producing point sources in the frequency plane P1 that interfere in the image plane P3, in multi-frequency TSH the process is halted at the frequency plane Pl, where a storage medium records the amplitudes of the point sources. Once all point source amplitudes are recorded, a separate processor, not necessarily a lens at the lens plane P2, performs the Fourier transform to produce an image in the image plane P3. Multi-frequency TSH avoids the integration of bias terms (Equation (37)) in the image, potentially permitting relatively higher dynamic range images than obtainable with most other embodiments.

Figure 18:
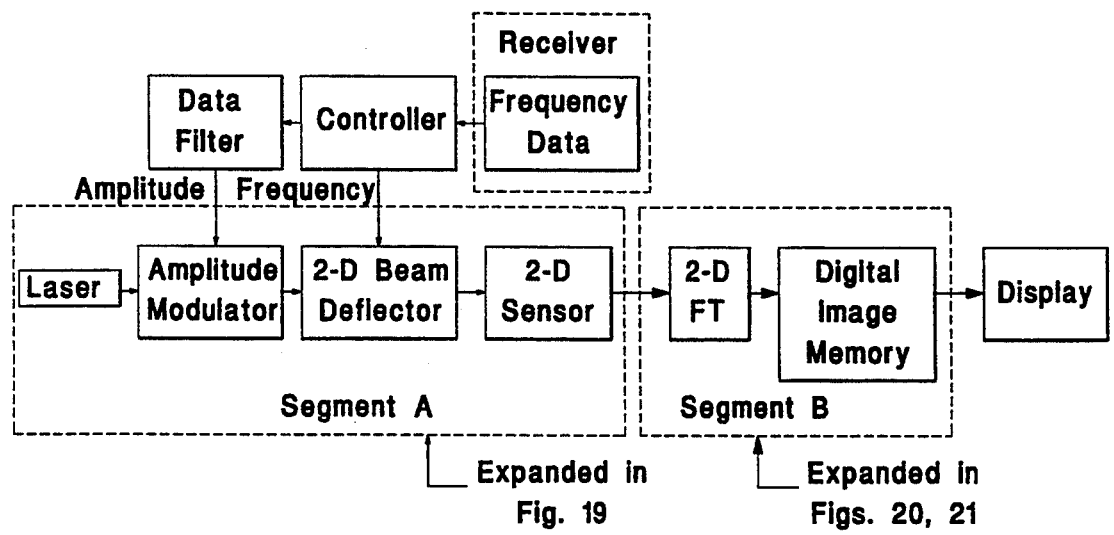
FIG. 18 shows a functional flow diagram of an example of an image synthesis system using multi-frequency TSH.

FIG. 18 provides a functional flow diagram of an example of an ImSyn TM system that uses a multi-frequency TSH technique. The upper row of elements shown in FIG. 18 illustrates elements associated with the receiver and the controller. The lower row of elements shown in FIG. 18 illustrates components that perform the image synthesis. The group of elements identified collectively as Segment A in FIG. 18 performs the function of recording frequency data onto a uniformly spaced, rectilinear photosensor array. The group of elements identified collectively as Segment B in FIG. 18 then uses standard means for performing two-dimensional Fourier transforms on the frequency data to regenerate an image.

Figure 19:
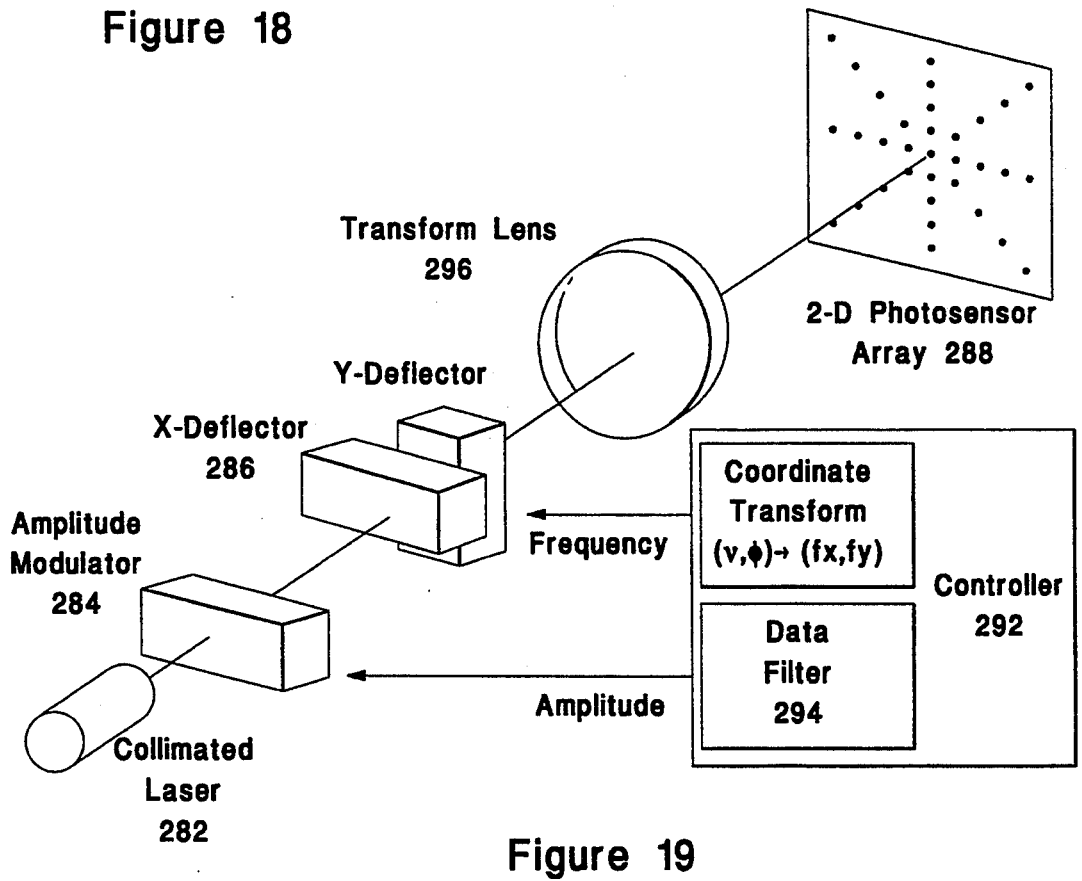
FIG. 19 shows an example of a first segment of the multi-frequency TSH of FIG. 18.

FIG. 19 illustrates in greater detail an example of the group of elements identified collectively as Segment A in FIG. 18. As shown in FIG. 19, a collimated laser light source 282 and x-y deflectors 286 are used to record frequency samples on a two-dimensional photosensor array 288. The controller 292 supplies amplitude and spatial frequency data to the elements of Segment A. The controller 292 converts spatial frequency components from the sensing system's coordinate system (e.g., polar) to the coordinates of the two dimensional beam deflector (e.g., an x- and y-deflector, as in FIG. 19). The controller 292 also sequentially inputs amplitude data to a laser modulator 284, applying a data filter 294 as needed.

The collimated laser source 282 is modulated by the amplitude modulator 284, deflected by the two-dimensional beam deflector 286 and focused by a transform lens 296 onto a two-dimensional photosensor array 288. In this way the two-dimensional Fourier data may be recorded onto a device which stores amplitudes in a rectilinear (x-y) format. Any frequency data that does not fall on a single photosensor element is naturally interpolated onto multiple photosensors and thus onto regular intervals.

In general, the frequency data of a real object will have complex amplitudes associated with each frequency. In other embodiments of TSH systems described herein, both amplitude and phase information derived from the controller may be carried by optical beams. In multi-frequency TSH, photosensing in the frequency plane prevents an optical beam from carrying phase information. Therefore, multi-frequency TSH is performed in two channels, representing the real and the imaginary parts of the frequency data. The signal powers in the two channels are recombined at the image.

In practice, the two-dimensional Fourier transform may be performed using a number of different techniques. In some of these techniques, the Fourier transform may be performed using two sequences of one-dimensional Fourier transforms and a corner-turning memory. Other techniques use the two-dimensional data from the photosensor array to drive a two-dimensional spatial light modulator, and perform the Fourier transform in two dimensions simultaneously using optics. In each of the optical implementations in which only amplitude information is maintained, two channels of information are maintained to account for the real and imaginary parts of the Fourier transform until final reconstruction of the image.

Figure 20:
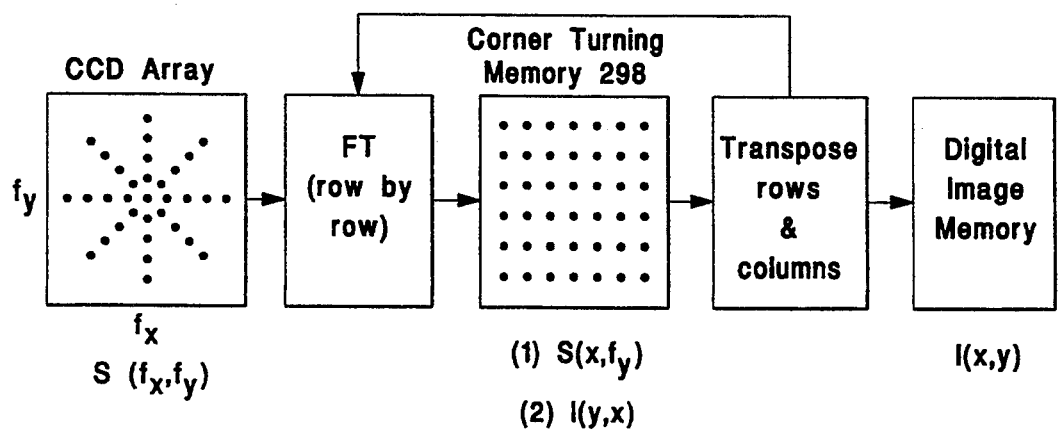
FIG. 20 shows an example of how a two-dimensional Fourier transform may be performed by performing two one-dimensional Fourier transforms.

FIG. 20 illustrates an example of how a two-dimensional Fourier transform may be performed by performing two one-dimensional Fourier transforms. First, the one-dimensional transform is performed for each row of data in the x-direction. The results of this transform are stored in a corner-turning memory 298. The corner-turning memory 298 transposes the addressing of rows and columns of the array. The one-dimensional Fourier transform is performed on the columns (representing the y-direction). This results in a full two-dimensional Fourier transform. Each of the one-dimensional Fourier transforms could be performed by digital means, using a discrete Fourier transform or a Fast Fourier transform (FFT). Alternatively, each of the one-dimensional Fourier transforms may be performed using analog means, such as optics.

Figure 21:
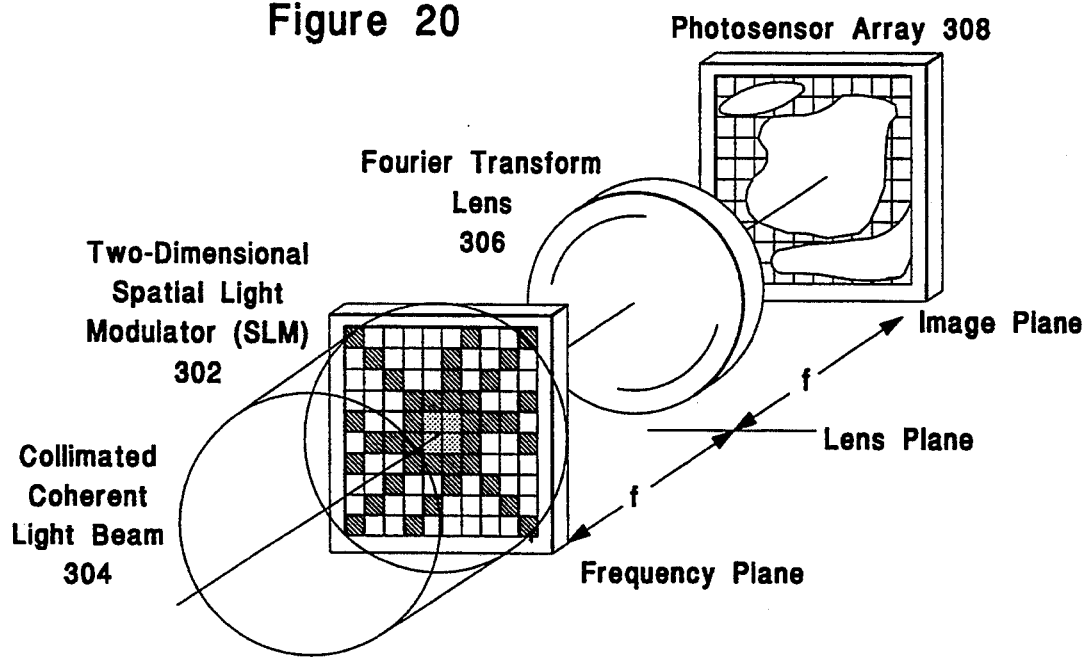
FIG. 21 shows an example of a method of performing Fourier transforms of two-dimensional distributions using lenses in optical systems.

FIG. 21 illustrates an example of how lenses in optical systems may be used to perform Fourier transforms of two-dimensional distributions. In the illustrated example, the digitized and stored frequency amplitudes from the photosensor array 288 are used to drive a two-dimensional spatial light modulator 302. An electronically controlled spatial light modulator modulates a readout laser beam 304 on reflection or transmission. The modulated beam 304 is optically transformed in two dimensions by a Fourier lens 306 and recorded on a photosensor array 308. This produces one channel of the Fourier transform of the image frequency data.

Alternatively, the light in the Fourier plane may be detected directly on a spatial light modulator, rather than on a CCD. Once all Fourier components have been recorded, optical techniques may be used to perform a two-dimensional Fourier transform. This technique uses an optically-addressable spatial light modulator which modulates a readout beam proportional to the time-integrated illumination of its writing facet.

The results of the two-dimensional Fourier transform of the Fourier data may be stored in a digital image memory. In this memory, the power of the real and the imaginary parts of the transforms may be combined to yield a final reconstructed image.

Tomography Example. Multi-frequency TSH potentially provides a high-dynamic-range means of processing non-uniformly spaced frequency data from a variety of sensing geometries. Tomography with a fan beam geometry is an illustrative example in which non-uniformly spaced frequency samples may be obtained.

As used herein, the term "rebinner" refers to a digital processor that sorts data into sets that have the same projection angle. Fan-beam tomographic data passed through a rebinner correspond to nonlinearly spaced, but parallel, projections of an object. Following the notation previously used herein, the function $s(p,\phi)$ is the parallel projection data at orientation $\phi$ with ordinate p. The data is assumed to be, in general, non-uniformly spaced along the p-axis.

An optical Fourier transform may be performed for each parallel projection angle, producing the spectrum $S(\nu,\phi)$. An optical one-dimensional Fourier transform may be performed, for example, using the techniques described by Lee et al. (SPIE Semin. Proc. 341, pp. 86–93, 1982). The results of the optical Fourier transform may be collected on a linear (one-dimensional) photosensing array (CCD). In theory, the Fourier transform may be performed digitally, but with difficulty, since the discrete Fourier transform (DFT) algorithms (including the FFT) require data that is regularly spaced. Rebinned data would not be regularly spaced. In such a case, the rebinned data would have to be pre-processed by an interpolator prior to a digital Fourier transform.

Following a format similar to that illustrated in FIG. 19, the rebinned data may be read, filtered, and used to amplitude modulate a light source. The light source may also be modulated by an x-y deflector. This enables the one-dimensional frequency domain data to be written onto a two-dimensional photosensor array at each projection angle. Control signals drive the deflectors so that any slice at a particular angle $\phi$ of the two-dimensional data through the origin corresponds to the one-dimensional frequency spectrum $S(\nu,\phi)$, for that projection angle. The light intensity at any point on the CCD is equal to the frequency component magnitude for the given frequency and orientation $\phi$. Interpolations of the frequency data amplitudes onto uniformly spaced intervals are performed inherently by the photosensing device, storing amplitudes in a rectilinear (x-y) format. This process is substantially similar to the scan conversion process discussed previously herein.

Scan conversion eliminates the need for computed interpolation of polar data samples onto uniform rectilinear intervals. The deflection angle of the beam in x- and y-dimensions is proportional to the cosine and sine, respectively, of the projection angle $\phi$. The magnitude of the deflection is set by the frequency $\nu$, and the intensity of the light beam is the frequency amplitude $S(\nu,\phi)$. Since the one-dimensional samples rotate around the center of the photosensor (zero frequency) as the projection angle sweeps from $\phi=0$ to $2\pi$, the density of samples falls off radially as $1/|\nu|$. Therefore, the data input to the modulators is preferably frequency weighted (filtered) to offset the radial density of the recorded amplitudes. In the limit of many projection angles, the frequency weighting may simply be $\nu$, although other filter functions may be used to enhance certain types of application-specific features of the image. The properly weighted amplitudes of the Fourier space are optically written at each pixel of the photosensor array defined by the frequency coordinates $f_x$ and $f_y$, such that $$f_x = \nu\cos(\phi) \text{ and } f_y = \nu\sin(\phi). \tag{40}$$

The two-dimensional frequency data is then Fourier transformed to produce the image, $I(x,y)$. By the projection slice theorem, the two-dimensional Fourier transform of the distribution $S(f_x, f_y)$ is equal to the two-dimensional Fourier transform of the properly weighted data $S(\nu,\phi)$:

$$I(x,y) = \int\int S(f_x, f_y) F(x,y) df_x \, df_y = \int\int |v| S(v,\phi) F(r,\phi) dv \, d\phi \quad (41)$$

where F(.) is the Fourier kernel appropriate to the respective coordinate system.

An Alternative ImSyn ™ System—Non-Fourier Basis Functions. An ImSyn ™ system in accordance with the present invention may be equally applicable to basis functions that are not two-dimensional sinusoids, nor spherical derivatives thereof. In such cases the data may not be Fourier components of an image, but may instead be the amplitudes and phases of more general basis functions as defined in Equation (1). Two-dimensional basis functions may be generated in ImSyn ™ using spatial light modulators (SLMs) to impart basis functions onto a light beam.

FIG. 22 depicts an example of a system for sensing an object using non-Fourier basis functions. Referring to FIG. 22, a sensing process using non-Fourier basis functions may be performed as follows: Light 312 from a laser or other optical source may be encoded with a generalized, two-dimensional, non-Fourier basis function 314. The basis function 314 may be imaged with an imaging lens 316 onto a distributed object 320. The light scattered from the object 320, when illuminated by the two-dimensional basis function 314, may be collected by a collecting lens 322 and detected by a point photosensor 324. The magnitude of the detected scattered light corresponds to the amplitude of the basis function 314 projected on the object 320 at the time, forming the sensing integral of Equation (4). From the results of Equation (6), the detected light for the k'th basis function is equal to the basis function amplitude A(k).

The reconstruction may be performed in a manner similar to the measurement of basis function amplitudes. A primary difference between the sensing process and the reconstruction process is that the sensing process generally includes the steps of light collection and point detection, whereas in the reconstruction process these steps are replaced by the corresponding steps of light modulation and illumination. Additionally, in the sensing process the object exists physically, whereas in the reconstruction process the image of the object is synthesized on a two-dimensional photosensor array. The two processes are essentially similar with respect to generation of the basis functions.

FIG. 23 illustrates an example of optical reconstruction using generalized basis functions. In the reconstruction process illustrated in FIG. 23, the amplitudes of the basis function may be controlled by modulating a light beam 328 emitted by a laser (or other optical) source 332. Amplitude modulation may occur either internal to the optical source 332 by varying the gain, or externally with a point modulator 334. The form of each basis function may be created by the spatial modulation of the beam by an SLM 336. The SLM 336 may then be imaged onto a photosensor array 338 which integrates many basis functions together. The integration capacity of the photosensor array 338 may be assisted by a digital integrator 342. The digital integrator 342 may preferably comprise a memory and an accumulator.

Two-dimensional basis functions may be generated optically by several techniques. These techniques may be classified according to whether the basis functions are separable or non-separable two-dimensional distributions. A two-dimensional function f(x,y) is separable if it may be expressed as the product of two functions, one of which has dependence in the orthogonal dimension to the other. The function f(x,y) is separable into $f_1(x)$ and $f_2(y)$ if $$f(x,y) = f_1(x) f_2(y) \quad (42)$$

where $f_1(x)$ and $f_2(y)$ are one-dimensional functions, and x and y are independent variables. Basis functions that are separable may be expressed as the outer product of two one-dimensional basis functions. A two-dimensional object T(x,y) may be expressed as the weighted integral of a complete set of separable basis functions, indexed by k, such that $$T(x,y) = \int A(k) f_1(x,k) f_2(y,k) dk. \quad (43)$$

Figure 24:
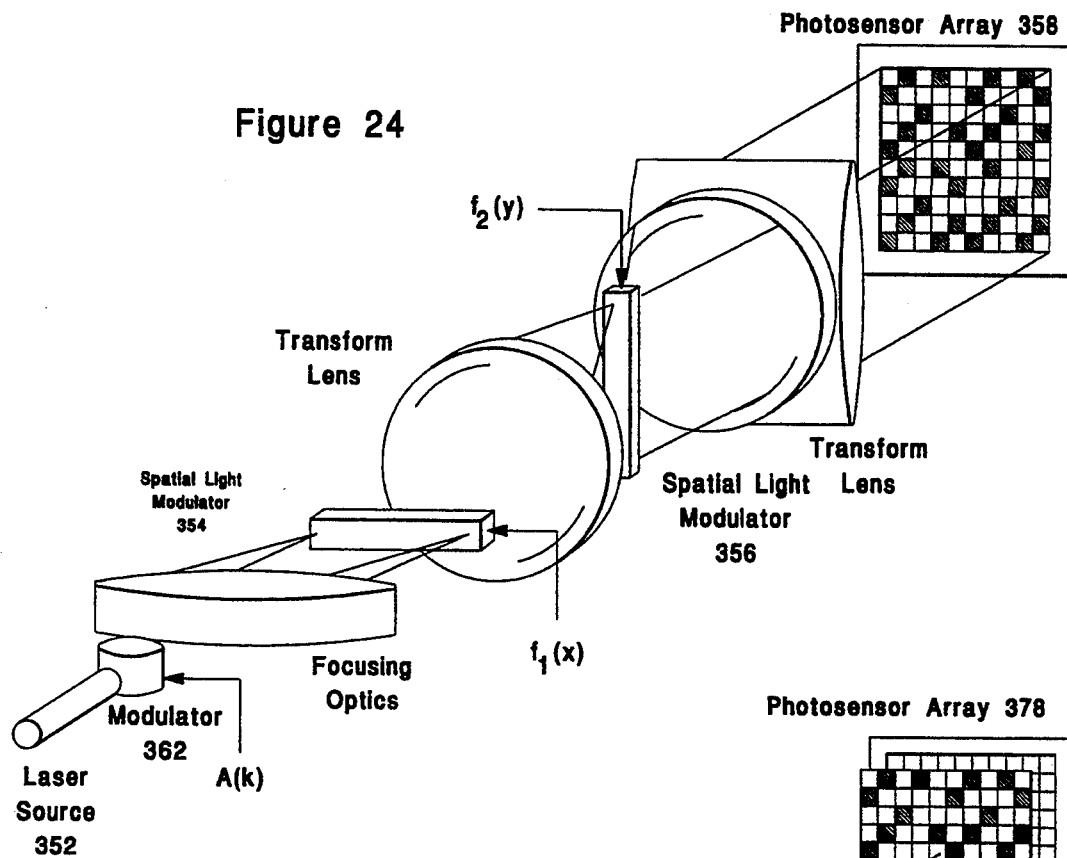
FIG. 24 shows an example, in an optically based ImSyn TM system, of how separable basis functions may be created by multiplying the modulation of a light source by one-dimensional functions in orthogonal spatial light modulators.

FIG. 24 illustrates an example of the creation of separable basis functions in an optically based ImSyn ™ system. In the example illustrated in FIG. 24, separable basis functions may be created by multiplying the modulation of the light source 352 by one-dimensional functions in orthogonal SLMs 354, 356. A light source 352 may be modulated with the time-sequential amplitudes, A(k), of the basis functions. The amplitude-modulated light beam may be focused in one dimension to form a line of illumination of the aperture of a one-dimensional SLM 354. The SLM 354 modulates the light beam, impressing the function $f_1(x)$ on the beam. The beam may be transformed in two dimensions so that the beam is collimated in the orthogonal y-direction but converges to a vertical line in the x-dimension. A second SLM 356, oriented in the y-direction and located at the line image of the source, modulates the beam with the function $f_2(y)$, performing a multiplication between $A(k)f_1(x)$ and $f_2(y)$. The output of the second SLM 356 may be recollimated in the x-direction and imaged in the y-direction onto a photosensor array 358. The distribution of the light I'(x,y,k) on the photosensor 358 at the sample k is equal to $$I'(x,y,k) = A(k) f_1(x,k) f_2(y,k). \quad (44)$$

The basis functions $f_1(x)$ and $f_2(y)$, with corresponding amplitudes, may be formed for all samples k. The resulting light distributions on the photosensor 358 may be integrated over all samples to produce the two-dimensional image I(x,y), such that $$I(x,y) = \int I'(x,y,k) dk. \quad (45)$$

The resolution of the image may be limited by the lesser of the number of resolvable samples in each of the SLMs 354, 365 or the number of photosensors pixels in each dimension.

An example of separable, non-Fourier basis functions are linear recursive sequences (LRS). Two LRS functions are used to form a two-dimensional basis function in their outer product. The function $f_1(x)$ may be, for example, a maximal length LRS of length n, and $f_2(y)$ would be the same function with an extra zero inserted, thus having length n+1. The outer product is a basis function virtually orthogonal to all two-dimensional translations (delays) of itself. (It becomes truly orthogonal as n approaches infinity). The outer product may be formed by optically multiplying the two functions in one dimensional SLMs and imaging the product onto an object (for sensing) or a photosensor array (for reconstruction). Other basis functions may be derived by delaying each function by one sample, optically forming the product, and projecting the product onto the object. Acousto-optic modulators are preferred SLMs for such an application.

The reconstruction of the LRS example may be mapped onto the components of the separable ImSyn TM system shown in FIG. 24. The optical source 352 may be temporally modulated with each amplitude measurement by a modulator 362. The one-dimensional SLMs 354, 356 may be implemented with a pair of crossed acousto-optic Bragg cells, each of which contains replicas of the LRS functions $f_1(x)$ and $f_2(y)$, respectively. The product of the amplitude modulation with the optical multiplication of the two LRS sequences may be imaged onto a two-dimensional photosensor array 358, such as a CCD array. The integrator 342 comprises a digital accumulation buffer, which assists the photosensor array 358 in integrating the final image from individual basis functions. Light beam modulation with a new basis function amplitude occurs at a rate equal to the shift of the LRS functions in the Bragg cells by one sample. This data rate corresponds to the bandwidth of the cells. The reconstruction proceeds until $n(n+1)$ basis functions and their amplitudes have been processed by the ImSyn TM system.

The above-described reconstruction process is akin in some respects to triple-product optical processors (as described, for example, in U.S. Pat. No. 4,225,938 to Turpin). Non-Fourier based TSH may be viewed as an extension of the triple-product processor, because it includes both the measurement and the reconstruction of the object basis functions.

In an alternative non-Fourier ImSyn TM system, the optical complex amplitudes of two one-dimensional SLMs oriented orthogonal to each other may be coherently added, rather than multiplied. The two beams modulated by each SIaM may be combined either by being obliquely imaged onto the same plane or through use of a beam splitter. In this alternative implementation the output of the SIaM may be multiplied by the distribution of the other only upon interference at the photosensor plane.

Figure 25:
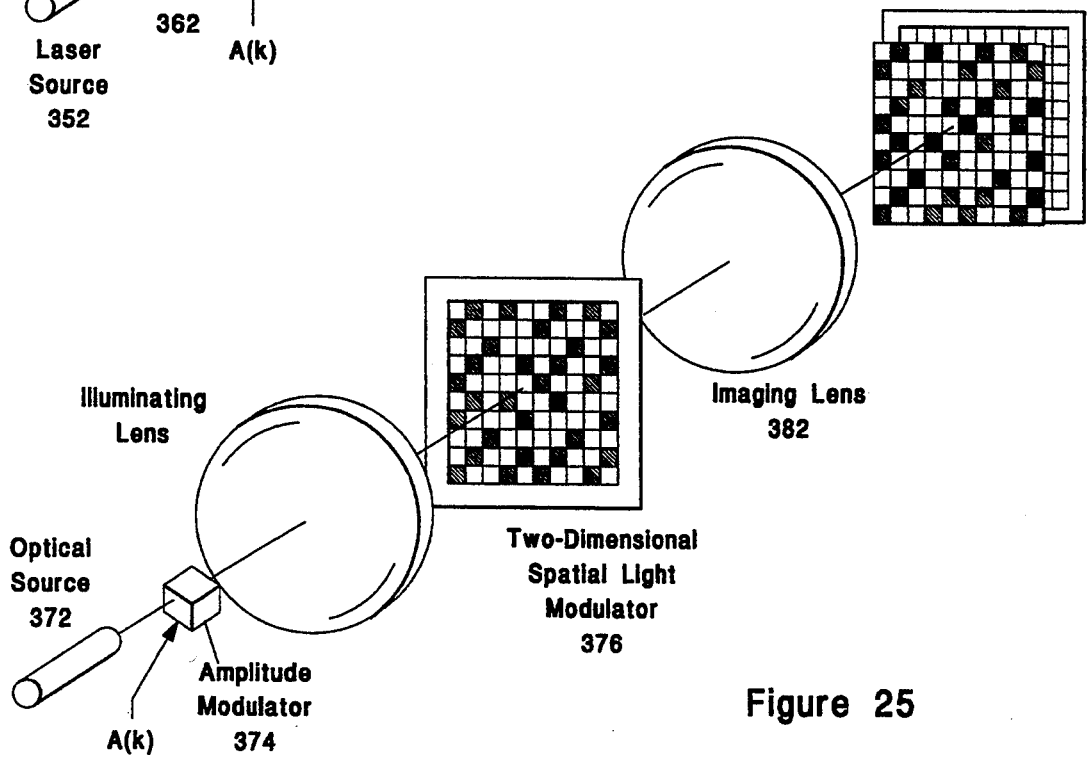
FIG. 25 shows an example of a basis function generating means comprising a two-dimensional spatial light modulator imaged onto a photosensor array.

If the basis functions used are not separable, then the basis function generator may comprise a two-dimensional SLM 376 imaged onto a photosensor array 378, as shown, for example, in FIG. 25. An amplitude modulator 374 impresses the basis function amplitudes A(k) on the beam from a coherent optical source 372, as in the separable case. Each two-dimensional basis function is stored on the two-dimensional SLM 376, and the beam reads the distribution. An imaging lens 382 images the two-dimensional basis function onto the photosensor array 378. Subsequent basis functions are similarly impressed onto a light beam by the SLM 376 and integrated by the photosensor 378. The capacity of the photosensor may be extended by an integrator 382, as in other ImSyn TM systems.

An Alternative ImSyn TM System—Image Synthesis Without Optical Waves. An ImSyn TM system in accordance with the present invention may perform the sequential summation of basis functions without the use of optics. Such a system may use a mechanism other than optical radiation to individually generate waveforms that produce basis functions on a recording device. Such a system may incorporate electrons, neutrons, α-particles, or other particles or radiation that exhibit wave-like behavior. In such a system, appropriately weighted and phased basis functions may be integrated to produce an image of a sensed object.

Such an alternative embodiment would also relate to a system that used particles or non-optical waves to interpolate non-uniformly spaced and/or polar formatted Fourier projection data onto a uniform, rectilinear sampling grid. Of specific consideration is a system that uses the deflection of electrons or similar particles to record basis function amplitudes on a sensor array in the Fourier plane of the image. Such a system could produce a two-dimensional Fourier data representation of polar data on a recording device and then use two-dimensional Fourier transforms to produce an image.

Advantages. A TSH system in accordance with the present invention provides a variety of advantages over other known image synthesis systems. In particular, optical embodiments of an ImSyn TM system in accordance with the present invention permit great image synthesis speed in comparison to digital computer based systems. An optical ImSyn TM can operate easily in non-rectangular coordinate systems, whereas digital systems cannot Some of the more significant advantages of the present invention are discussed in greater detail below.

Resolution and spatial bandwidth. A sensing system in accordance with the present invention may be represented as a set of synthetic virtual lenses (in contrast to the single lens set of known optical systems). In such a representation, the lenses are referred to as virtual, since the lenses do not exist physically. The lenses are referred to as synthetic, since the lenses are created for the geometry and sensing parameters of each sequential measurement.

It is known that the light gathering properties of an optical system may be defined by the numerical aperture (or "NA"). The numerical aperture may also be related to the spatial bandpass characteristics of an optical system. There is a useful relationship between the numerical aperture of an ordinary optical system and the spatial bandwidth or resolution of a TSH system in accordance with the present invention. It may be shown that a TSH system is capable of achieving extremely high numerical apertures and spatial resolution capabilities, limited primarily by the diffraction of the sensing aperture and the wavelength.

The numerical aperture NA of a lens in air may be defined as the sine of the solid half angle ($\theta$) made by the lens aperture with respect to its axial focal point, such that $$NA = n_o \sin \theta \qquad (46)$$

where $n_o$ represents the refractive index of the object space. In air, this refractive index is essentially equal to one, but the use of oils or water will typically increase the index. Numerical apertures in common optical systems are frequently found near NA=0.5, but rarely approach NA=1.0, and then only when the object and the lens are immersed in a fluid having an index greater than air.

A TSH system in accordance with the present invention is not limited by the characteristics of physical lenses, because the sensing system does not require the use of lenses to image the object. Consequently, the bandwidth of such a system may be limited primarily by the diffraction of the sensing radiation from the object. This limitation may be defined by the Bragg condition (Equation (17)), yielding a maximum spatial bandwidth of $$v_{max} = \frac{1}{d} = \frac{2\sin\theta}{\lambda} \quad (47)$$

where d represents the limiting resolution of the system. Since $\theta$ represents the angle between the propagation direction of an incoming wave and a line perpendicular to the object, the maximum spatial bandwidth corresponds to an incoming wave that glances the surface of the object. Maximum bandwidth is consequently obtained when $\theta = \pi/2$. While this condition may be difficult to achieve practically, many non-imaging sensing situations allow $\theta$ to be close to $\pi/2$. The limiting resolution d may be expressed in terms of the numerical aperture as $$d = \frac{\lambda}{2\,NA}. \quad (48)$$

When NA is equal to one, as $\theta$ approaches $\pi/2$, the resolution obtainable is equal to half the sensing wavelength. The resolution of a good lens system is equal to the wavelength of visible light. It may be seen, therefore, that a TSH system in accordance with the present invention may achieve a resolution that is approximately half that of a conventional optical system, or a bandwidth that is approximately twice that of a conventional optical system in each dimension.

TSH systems in accordance with the present invention are therefore capable of greater numerical apertures, resulting in finer resolving capability, than optical imaging systems based on physical lenses.

Aberrations. The images that are formed by optical systems composed of real lenses are limited in quality by the aberrations of those real lenses. Optical systems that use spherical lenses avoid aberrations only when such systems operate in a realm in which the paraxial approximation and its small angle assumptions are accurate. Non-spherical corrections may be applied to real lenses, but it is nevertheless difficult to remove all aberrations and form a perfect image.

A TSH system in accordance with the present invention avoids lens aberrations in at least several different ways. For example, a TSH system in accordance with the present invention is not required to directly image an object. Instead, a TSH system is capable of measuring specific components of the object from small apertures individually optimized for the sensing of each component. An image may then be synthesized from optical waves that produce nearly exact representations of the measured object components. As described herein, an ImSyn TM system in accordance with the present invention may utilize spherical waves to construct the image, instead of the plane waves used in the Fourier reconstruction. A primary requirement in most TSH sensing systems is that the aperture must be many wavelengths away from the object.

An ImSyn TM system may comprise an optical computing system that uses lenses to implement mathematical operations. Such an ImSyn TM system may itself be subject to systematic errors resulting from aberrations within the system. These aberrations may, in principle, be minimized by at least the following techniques: (1) electronically adjusting the ImSyn TM inputs, (2) using the internal optics in geometries approaching the bounds of the paraxial approximation, and/or (3) using aberration-corrected lens elements. Any error introduced to the ImSyn TM system because of optical aberrations should, in practice, be far less than those introduced in a lens-based fixed-aperture sensing system. When all the degrees of freedom of the sensing process are engineered into the ImSyn TM then exact scaled versions of the sensing waves may be reconstructed to produce aberration free images.

Some of the non-Fourier ImSyn TM embodiments discussed herein may rely on lens-based optical systems to image basis functions for both sensing and reconstruction. They may therefore be subject to the same aberrations as optical systems which directly image the object, and may not gain an advantage in terms of aberrations.

Speed. An optical ImSyn TM system in accordance with the present invention may simultaneously project an entire basis function component onto every pixel of a photodetector array. A digital system for performing a corresponding process would address each pixel sequentially. In the present invention, if acousto-optic technology is used to deflect plane waves, an individual basis function may be projected every nanosecond. If electro-optic devices are utilized, then the time required may be shortened to 100 picoseconds. At five operations performed per image point per basis function, these times correspond to processing rates of 5 and 50 POPS (Pecta ($10^{15}$) Operations Per Second, or thousands of Teraflops), respectively, for images containing one million pixels.

Such high rates derive from the parallel nature of generating basis functions across the entire image, and qualify ImSyn TM as a means of super-computing.

Non-rectangular Grid. Many scattering geometries naturally generate spatial frequency components that do not fall on a rectangular grid in frequency space. Instead, spatial frequencies may often be described by their polar or spherical coordinates. The spatial frequencies input to an optical ImSyn TM may be readily transformed, through a simple linear transformation, to the two-dimensional coordinates that directly control beam deflectors. The resulting beam deflections may be focused to point source locations in the frequency plane P1 of an optical system. The projection of interfering point sources may then proceed, independently of whether the frequencies fall on a rectangular grid. No interpolation is necessary.

In contrast, systems that rely on an FFT for image synthesis need to perform two steps: coordinate transformation and interpolation. First, the polar or spherical coordinates of a spatial frequency are linearly transformed into rectangular coordinates. Second, the complex amplitudes of the spatial frequency components must be interpolated between neighboring data elements because, in general, the spatial frequencies will not lie on uniform intervals in the rectilinear coordinate required of FFT input. This interpolation step is extremely time consuming and introduces error into the resulting image. The scan conversion and detection utilized in the Fourier-based ImSyn TM systems solves this interpolation problem. FIG. 26 shows an example of polar frequency data 392 written on a rectangular array of photosensors 394. Any frequency data that does not fall on a single photosensor element may be naturally interpolated onto multiple photosensors and thus onto regular intervals.

This advantage is particularly useful where it is difficult to constrain the scattering geometry. In the case of synthetic aperture radar (SAR), for example, a transceiver mounted on a moving aircraft samples the spatial frequency components of the object. Each position defines a different spatial frequency. To avoid frequency samples off of a rectangular grid, the aircraft could only sample at a discrete set of spatial positions. By using a TSH system, the image may be synthesized from any set of samples in frequency space.

Dynamic Range. In some applications in which the image has nearly uniform brightness, some of the ImSyn TM systems described herein may be limited in dynamic range by the capacity of the photosensing array in the image plane P3. In practice, each time a basis function forms on the photosensors, a bias term is projected with the basis function. This results in a loss of dynamic range when all basis functions have approximately the same amount of bias energy. A multi-frequency TSH embodiment is a preferred embodiment where wide dynamic range images are needed in the presence of nearly uniform image features, such as in medical imaging.

The Fourier transform process of a multi-frequency ImSyn TM combined with a scan conversion process as described herein, achieves a significant dynamic range improvement over some other ImSyn TM approaches by better utilizing the photosensors (CCDs) that measure the one-dimensional Fourier transforms performed as part of the two-dimensional Fourier transform. In these other ImSyn TM cases, a bias is added to the signal for each basis function. In multi-frequency TSH, since an entire ensemble of data is transformed in parallel, only one bias term is added for each ensemble.

Applications. Applications of time sequential holography (TSH) may utilize a combination of a sensing methods and ImSyn TM embodiments to measure a property of an object and reconstruct its image. The following paragraphs describe some examples of the ways in which the present invention may be used to reconstruct images.

Basic Camera. A TSH camera may be constructed that uses light (IR, visible, or UV) as the sensing wave. The second alternative sensing method described herein and its variation are the preferred sensing methods. FIG. 10 illustrates an example of a basic camera sensing system. The camera system may measure the distribution of reflectance, refractive index, luminance, or transmittance of an object. Any ImSyn TM embodiment may be used to reconstruct the image. The basic camera approach may also be used to extract image components from an existing photographic film image for applications in image enhancement, compression, communication, or the like.

Optical Microscope. An optical microscope implementation comprises a TSH system that uses light (IR, visible, or UV) to sense a microscopic object using the basic camera approach. The sensing method comprises an optical implementation of the second alternative sensing method described herein. The primary difference between a TSH microscope and a TSH camera is the scale of the projected basis functions. A TSH microscope represents an improvement in resolution over standard optical microscopes, as discussed herein. Any ImSyn TM embodiment may be used to synthesize the image.

Acoustic Microscope. An acoustic TSH microscope is an application in which the object may be exposed to acoustic waves instead of light waves. In this application, the receiving means may include acoustic transducers for direct detection of scattered acoustic waves. That is, time sequential acoustic holography may be performed. Either the first or second alternative sensing methods described herein or their variations are preferably utilized. This application is an acoustic analog of the synthetic aperture radar (SAR) application described herein. The TSH acoustic microscope may measure acoustic impedance or reflectivity of an object or region under examination. Any ImSyn TM embodiment may be used to synthesize the image.

Acousto-optic Microscope. An acousto-optic microscope comprises a variation of the acoustic microscope. The acoustic basis functions may be measured by light scattering either directly from the surface of the object or from a material such as water or oil in which the object is immersed. Any ImSyn TM embodiment may be used to synthesize the image.

Acoustical and Ultrasonic TSH. Acoustical and ultrasonic TSH are applications of TSH in which the sensing process uses acoustical waves. Acoustical and ultrasonic TSH may use either the first or second alternative sensing methods described herein to acoustically sense an object. The receiver may comprise acoustical receivers or an optical system that scatters light from surface acoustical waves. The image may be reconstructed using any ImSyn TM embodiment.

TSH Sonar. A TSH sonar system comprises an implementation of a means for performing underwater acoustical imaging. It is essentially an example of acoustic TSH. TSH sonar may use either the first or second alternative sensing methods described herein, or their variations, to sense the acoustic impedance of an object. The receiver may comprise acoustical receivers. The image may be reconstructed using any ImSyn TM embodiment.

Seismological TSH. Seismological TSH is an application of acoustical TSH. Seismological TSH may use either the first or second alternative sensing methods described herein or their variations to acoustically sense the Earth's interior. The receiver may comprise acoustical receivers. Seismological TSH may map spatial representations of acoustic velocities or densities using any ImSyn TM reconstruction embodiment.

Synthetic Aperture Radar. TSH synthetic aperture radar (SAR) utilizes radio frequency (rf) electromagnetic waves in an application of the first alternative sensing method described herein or its variation. Sensing methods that are forms of the second alternative sensing method described herein and its variation may be applied to SAR, but for practical reasons they are less preferable. A sensing means may be located on a flying aircraft in order to vary the orientation of spatial frequency components of emitted radio waves. The magnitude of the spatial frequency components may be varied by a combination of change in the aircraft altitude and transmitted rf frequency. The flying aircraft need not be confined to a straight line path, since the controller may instruct the ImSyn TM to generate any basis function component. The transmitter and receiver need not be positioned only in far-field locations, because the ImSyn TM embodiments may also generate the curved basis functions that result from near-field scattering from the object. FIG. 9 illustrates an example of a sensing scenario and system for SAR applications. Any basic ImSyn TM embodiment is most generally appropriate for reconstruction of SAR images. SAR images typically represent the spatial distribution of radar reflectance over a region of the Earth's (or planet's) surface.

ISAR, Lidar. Inverse Synthetic Aperture Radar (ISAR) may image moving airborne objects with a fixed transmitter/receiver in a method that is algorithmically similar to SAR. Applications of TSH to ISAR may utilize the same systems as used in SAR image generation. Spatial frequency may be determined by the movement of an object and the transmitted radar frequency. Laser radar (lidar) is an application similar to ISAR that may measure density or velocity of atmospheric constituents. TSH generation of lidar images may be useful for the monitoring of pollutants and the detection of wind shear. For these applications, the first alternative sensing method described herein or its variation may be used for sensing, and any of the ImSyn TM embodiments may be used for reconstruction.

Tomography with ionizing or non-diffracted radiation (including CT, PET, SPECT, and others that may be developed). TSH systems that are based upon the third alternative sensing method described herein may be applied to non-wave (non-diffracted wave) tomographic image reconstruction, such as x-ray computerized tomography (CT), positron emission tomography (PET), single photon emission computerized tomography (SPECT) and other non-wave (non-diffracted wave) sensing means. Any of the ImSyn TM embodiments may be used to reconstruct the image. When these applications require high accuracy images (as in medical uses), the multi-frequency ImSyn TM embodiments described herein may be the preferred reconstruction means to use.

Tomography with diffracted sources (e.g., radio, acoustic, or optical waves). TSH systems based on the third alternative sensing method described herein may be used to perform diffracted wave tomography. Typical examples include tomography with radio frequency (rf), acoustic, or optical waves. Planar or spherical wavefronts may be diffracted off of the structure of a three-dimensional object, and tomographic reconstruction processes may be used to reconstruct a two-dimensional slice of the object. The locations of spatial frequency samples in the frequency plane may be different than in non-diffraction tomography, but the natural interpolation and non-rectangular format of the TSH processors may make reconstruction using ImSyn TM more efficient than standard digital means. Any ImSyn TM embodiment may be used to reconstruct the image, although the multi-frequency method may be preferred for high dynamic range tomographic images.

Magnetic Resonance (MRI). Magnetic resonance imaging is an application that preferably uses the variation of the first alternative sensing method described herein for its sensing method. Any ImSyn TM embodiment may be used to reconstruct the image. The images formed may be maps of the proton density derived from detection of the magnetization of atomic nuclei.

If the magnetic field gradient is not uniform, then the resultant basis functions may be spherically curved in certain cases. In these cases, a basic ImSyn TM system may be used to reconstruct the image since they generate spherically curved basis functions. For example, curved basis functions may be obtained when the field gradient varies linearly in the spatial dimension. The basic ImSyn TM embodiments, therefore, may enable different magnet configurations than are used in current MRI systems.

Mathematical Transformations (general, Fourier, discrete cosine transform). TSH system may be viewed as transform or inverse-transform processors. Basic ImSyn TM and multi-frequency systems perform Fourier transforms of the sensed data. A non-Fourier alternate ImSyn TM system, as discussed herein, may perform other types of transforms as defined by its architecture.

When an ImSyn TM system is used for transformation, it runs in a reverse mode in comparison to an image synthesis application. Instead of composing an image from frequency data, the system decomposes an image into frequency (or other basis function) components. Because the ImSyn TM photosensors detect only the magnitude of optical signals, up to four iterations of the transformation must be executed, each with different phases, to account for the bipolar and complex nature of general transforms.

Those systems that are capable of Fourier transformations (i.e., the basic image synthesis and the multi-frequency embodiments) may be controlled such that they perform the special class of the Fourier transform called the discrete cosine transform, a technique commonly used in image compression applications. The discrete cosine transform (DCT) is defined by a specific set of phases. The control of the image synthesis system for use as a two-dimensional DCT processor essentially amounts to inputting these phase parameters into the system. For a basic system, the phase of one of the light beams would be altered appropriately. For multi-frequency systems, the relative amplitudes of the basis functions in the two complex channels would be controlled.

Atomic or Sub-atomic particle TSH. TSH may be performed with sensing means that are based on scattering with atomic or subatomic particles, such as electrons or neutrons. In order to implement either the first or second alternative sensing methods described herein, coherent sources of the particles may be utilized in the transmitting means. If the particles are not diffracted by the object, then the third alternative sensing method described herein may be utilized in the sensing means without coherent sources. The image may then be reconstructed using any ImSyn TM embodiment.

Storage or Memory Retrieval. A TSH system may be applied to the retrieval of data and the reconstruction of images from some forms of spatial storage media. Stored information may be represented as superpositions of distributed, weighted basis functions. The storage media for which TSH may be applicable include those which represent the stored data in two or three dimensions in a region or volume of material. Examples of such media and the methods of retrieval and image reconstruction are discussed below. Although TSH is concerned with the reading and reconstruction of distributed data, the reverse process may be an appropriate method of storing such data.

In a first example of TSH memory, a method similar to the second alternative sensing method described herein may be used to write spatial interference fringes in a thin, two-dimensional storage medium, similar to an optical disk. The spatial frequency components may be written in small regions at all angles to store a miniature copy of an object. Reading the storage or memory comprises exploiting a Bragg condition to retrieve specific basis functions from the medium. In particular, this application may be used to store images. The basis function components of the image may be written to and read from the storage medium using the second alternative sensing method described herein, as in the TSH microscopic camera. The image may be reconstructed using any ImSyn ™ embodiment. As discussed herein, this method of data storage and retrieval permits higher densities by a factor of two in each of two dimensions over standard optical storage methods, yielding a net improvement of a factor of four in data storage density.

A second example of memory retrieval reconstructs images from three-dimensional holographic media, such as photorefractive crystals. A holographic medium may be probed with a basis function, and the amplitude of the Bragg-diffracted light may be measured on a photosensor. The detected amplitude represents the basis function coefficient used by an ImSyn ™ processor to reconstruct that spatial component of the object. A sufficiently large range of two or three-dimensional basis functions may be used as probes to measure all spatial frequency amplitudes. The detected amplitude from each basis function probe may be used to weight the appropriate basis function in an ImSyn ™ system. The resulting image is a reconstruction of a two-dimensional surface within the storage medium. This method differs from photorefractive holography in that components of images are extracted with sensing waves and the image is reconstructed in an ImSyn ™ processor, instead of directly producing holographic reconstructions of a stored image.

Another example of this application uses optical tomography. A volume memory may store data as optical densities within a material. The memory may be read using rotatable incoherent light source arrays. These arrays may be used to form parallel optical projections at various angles of an arbitrary slice of the memory using the tomographic third alternative sensing method described herein. Through use of tomographic reconstruction methods as described herein, the image of a plane of the memory may then be reconstructed using any ImSyn ™ embodiment. This method may make feasible the use of highly dense, three-dimensional storage media for image archival.

While the description herein refers to particular embodiments of the present invention, it will be understood that many modifications may be made without departing from the spirit thereof. The accompanying claims are intended to cover such modifications as would fall within the true scope and spirit of the present invention.

The presently disclosed embodiments are therefore to be considered in all respects as illustrative and not restrictive, the scope of the invention being indicated by the appended claims, rather than the foregoing description, and all changes which come within the meaning and range of equivalency of the claims are therefore intended to be embraced therein.

What is claimed:

1. A system for producing an image of an object, the object defined by a plurality of basis functions, each of the plurality of basis functions defined by an amplitude, a phase and a spatial frequency, the system comprising:

transmitter means for transmitting radiation toward the object, the transmitted radiation defining a frequency, receiver means for receiving radiation reflected by the object, the radiation means comprising means for determining the amplitude and the phase of the radiation reflected by the object for generating an output corresponding to the amplitude and the phase of the radiation reflected by the object, the radiation reflected by the object and received by the receiver means satisfying a Bragg condition and corresponding to one of the plurality of basis functions, controller means, in communication with the transmitter means and the receiver means, for selecting the frequency of the radiation transmitted by the transmitter means, the controller means further comprising means for generating an output corresponding to the amplitude, the phase and the spatial frequency of the radiation reflected by the object, basis function generator means, in communication with the controller means, for generating an output corresponding to one of the plurality of basis functions of the object in response to the output of the controller means, the basis function generator means comprising means for interfering wavelike energy to thereby recreate the basis functions, integrator means for integrating the output of the basis function generator means and for producing an output corresponding to the integrated output of the basis function generator means, the integrator means comprising means for detecting the recreated basis functions, and means for summing the recreated basis functions over time, and display means for displaying the output of the integrator means.

2. A system as in claim 1 wherein the means for determining the amplitude and the phase of the radiation reflected by the object comprises means for comparing the radiation reflected by the object and a reference wave.

3. A system as in claim 1 wherein
the means for interfering wavelike energy comprises means for producing a plurality of optical wave patterns, and wherein
the means for detecting the recreated basis functions comprises an array of photodetectors for detecting the plurality of optical wave patterns.

4. A system as in claim 3 wherein each of the plurality of optical wave patterns is defined by an amplitude, a phase, and a spatial frequency, and wherein the amplitude, the phase and the spatial frequency of the optical wave pattern are determined in response to the output of the controller means.

5. A system as in claim 1 comprising means for sequentially changing the Bragg condition.

6. A method for producing an image of an object, the object defined by a plurality of basis functions, each of the plurality of basis functions defined by an amplitude, a phase and a spatial frequency, the method comprising the steps of:

measuring the amplitude, the phase and the spatial frequency of radiation reflected by the object that satisfies a Bragg condition and that corresponds to one of the plurality of basis functions, generating a signal corresponding to the measured amplitude, phase and frequency, the step of generating a signal comprising the step of interfering wavelike energy to thereby recreate the basis functions, repeating the steps of measuring and generating for a plurality of different Bragg conditions, whereby a plurality of different signals corresponding to a plurality of different basis functions are generated, integrating the plurality of signals, the step of integrating the plurality of signals comprising the step of detecting the recreated basis functions and summing the recreated basis functions over time, and displaying the integrated plurality of signals.

7. A system for producing an image of an object, the object defined by a plurality of basis functions, each of the plurality of basis functions defined by an amplitude, a phase and a spatial frequency, the system comprising:

measuring means for measuring the amplitude, the phase and the spatial frequency of radiation reflected by the object that satisfies a Bragg condition and that corresponds to one of the plurality of basis functions, means for sequentially changing the Bragg condition, whereby the measuring means measures a plurality of amplitudes, phases and spatial frequencies of radiation corresponding to a plurality of basis functions, generating means for generating a plurality of signals corresponding to the plurality of measured amplitudes, phases and frequencies, the generator means comprising means for interfering wavelike energy to thereby recreate the basis functions, integration means for integrating the plurality of signals, the integrator means comprising means for detecting the recreated basis functions, and means for summing the recreated basis functions over time, and display means for displaying the integrated plurality of signals.

8. A system for generating an image of an object, the object being defined by a plurality of basis functions, each of the plurality of basis functions comprising a plurality of parameters, the system comprising:

sensing means for measuring the parameters of the basis functions that satisfy a Bragg condition with respect to the sensing means, and image synthesis means for generating a reconstructed image of the object using the measured parameters of the basis functions, the image synthesis means comprising:
means for interfering wavelike energy to thereby recreate the basis functions,
means for detecting the recreated basis functions, and
means for summing the recreated basis functions over time.

9. The system as in claim 8 wherein the parameters of the basis functions comprise at least an amplitude and a phase, and wherein the sensing means comprises means for measuring at least the amplitude and the phase of the basis functions.

10. The system as in claim 9 wherein the image synthesis means comprises means for generating scaled copies of the basis functions in response to the measured amplitude and phase of the basis functions.

11. The system as in claim 10 wherein the image synthesis means comprises means for sequentially summing the scaled copies of the basis functions.

12. The system as in claim 10 wherein the image synthesis means comprises an energy sensor array and projection means for projecting the scaled copies of the basis functions onto the energy sensor array.

13. The system as in claim 10 wherein the image synthesis means comprises a display device and integration means for integrating a plurality of scaled copies of the bases functions, whereby an image of the object is recorded on the display device.

14. The system as in claim 8 wherein the function of measuring the parameters of the basis functions that satisfy a Bragg condition with respect to the sensing means comprises measuring an interaction of a signal and the object and wherein the sensing means comprising:

transmitter means for transmitting a signal that interacts with the object, and receiver means for receiving the signal after the signal has interacted with the object and for measuring the interaction of the signal and the object.

15. The system as in claim 14 wherein the transmitter means comprises a laser.

16. The system as in claim 14 wherein the transmitter means comprises an x-ray emitter.

17. The system as in claim 14 wherein the transmitter means comprises an electromagnetic radiation transmitter.

18. The system as in claim 14 wherein the transmitter means comprises an acoustical transmitter.

19. The system as in claim 14 wherein the transmitter means comprises a radar transmitter.

20. The system as in claim 14 wherein the transmitter means comprises means for generating a coherent source of atomic particles.

21. The system as in claim 14 wherein the transmitter means comprises means for generating a coherent source of subatomic particles.

22. The system as in claim 14 wherein the sensing means comprises:

spatial modulation means for spatially modulating the signal transmitted by the transmitter means with a waveform, whereby the interaction of the signal and the object is dependent upon the relative positions of the transmitter means and the object.

23. The system as in claim 14 wherein the parameters of the basis functions comprise at least an amplitude and a phase, and wherein the receiver means comprises means for comparing the signal and a reference signal after the signal has interacted with the object to thereby obtain the amplitude and the phase of the basis functions.

24. The system as in claim 14 wherein the receiver means comprises means for producing an output signal that corresponds to the amplitude and the phase of the signal after the signal has interacted with the object.

25. The system as in claim 14, comprising:

controller means for providing the transmitter means with frequency parameters necessary to transmit a signal at a frequency which satisfies a specific Bragg condition with respect to the sensing means, whereby a specific basis function of the object is measured.

26. The system as in claim 25 wherein each of the plurality of basis functions is defined by an amplitude, a phase and a spatial frequency, the system comprising:

basis function generator means, in communication with the controller means, for synthesizing a wave pattern corresponding to one of the plurality of measured basis functions of the object in response to an output of the controller means, the synthesized wave pattern having an amplitude, a phase and a vector spatial frequency, and wherein the controller means comprises means for controlling the amplitude, the phase and the vector spatial frequency of the wave pattern synthesized by the basis function generator means in response to the amplitude and the phase of the measured basis functions.

27. The system as in claim 26 wherein the wavelike energy comprises light and further comprising a pixelated photosensor array for detecting the wave pattern synthesized by the basis function generator.

28. The system as in claim 27 wherein the pixelated photosensor array comprises a charge-coupled device array.

29. The system as in claim 26 comprising
integrator means for digitizing and summing the wave pattern synthesized by the basis function generator means and for generating an output, and
display means for displaying the output of the integrator means.

30. The system as in claim 29 wherein the integrator means comprises a digital memory and an arithmetic processor for accumulating digitized data.

31. The system as in claim 29 wherein the display means comprises a video display.

32. The system as in claim 29 wherein the display means comprises a television monitor.

33. The system as in claim 29 wherein the display means comprises photographic film.

34. The system as in claim 29 wherein the display means comprises a permanent storage medium.

35. The system as in claim 34 wherein the permanent storage medium comprises at least one of a magnetic tape, a magnetic disk, and an optical disk.

36. A system for generating an image of an object, the object being defined by a plurality of basis functions, each of the plurality of basis functions comprising a plurality of parameters, the system comprising:
sensing means for measuring the parameters of the basis functions that satisfy a Bragg condition with respect to the sensing means, and
image synthesis means for generating a reconstructed image of the object using the measured parameters of the basis functions, wherein the image synthesis means defines a focusing plane, a frequency plane, a lens plane and an image plane, the planes being in mutually spaced, substantially parallel relationship, and wherein the image synthesis means comprises:
focusing lens means located substantially at the focusing plane for focusing collimated light waves to form light source images substantially at the frequency plane,
transform lens means located substantially at the lens plane for Fourier transforming the light source images in the frequency plane into a plurality of interference fringes in the image plane, the plurality of interference fringes in the image plane comprising scaled copies of the basis functions that satisfy a Bragg condition with respect to the sensing means,
photosensing means for detecting the interference fringes in the image plane, and
means for integrating the plurality of interference fringes.

37. The system as in claim 36 wherein
the transform lens means defines a focal length,
the frequency plane and the lens plane are separated by a distance substantially equal to the focal length of the transform lens, and
the lens plane and the image plane are separated by a distance substantially equal to the focal length of the transform lens.

38. A system for generating an image of an object, the object being defined by a plurality of basis functions, each of the plurality of basis functions comprising a plurality of parameters, the system comprising:
sensing means for measuring the parameters of the basis functions that satisfy a Bragg condition with respect to the sensing means, and
image synthesis means for generating a reconstructed image of the object using the measured parameters of the basis functions, wherein the image synthesis means defines a focusing plane, a frequency plane, a lens plane and an image plane, the planes being in mutually spaced, substantially parallel relationship, and wherein the image synthesis means comprises:
focusing lens means located substantially at the focusing plane for focusing collimated light waves to form light source images substantially at the frequency plane,
curvature lens means axially displaced a distance $\xi$ from the focusing plane for focusing collimated light waves to form light source images displaced a distance $\xi$ from the frequency plane,
transform lens means located substantially at the lens plane for Fourier transforming the light source images in the frequency plane into a plurality of interference fringes in an image plane, whereby the transform lens means produces a plane wave from the light source images located in the frequency plane and produces a spherical wave from the light source images with curvature defined by the displacement $\xi$, and
photosensing means for detecting the interference fringes in the image plane.

39. A system for generating an image of an object, the object being defined by a plurality of basis functions, each of the plurality of basis functions comprising a plurality of parameters, the system comprising:
sensing means for measuring the parameters of the basis functions that satisfy a Bragg condition with respect to the sensing means, and
image synthesis means for generating a reconstructed image of the object using the measured parameters of the basis functions, wherein the image synthesis means defines a frequency plane, a lens plane and an image plane, the planes being in mutually spaced, substantially parallel relationship, and wherein the image synthesis means comprises:
beam generator means for generating a collimated beam defining an amplitude and a phase,
amplitude modulation means for modulating the amplitude of the collimated beam,
beam splitting means for dividing the amplitude modulated beam into a first beam and a second beam,
deflection means for deflecting the first beam in at least two substantially perpendicular directions,
focusing lens means for focusing the deflected first beam to form a first light source image substantially at the frequency plane,
phase modulation means for modulating the phase of the second beam,
curvature lens means for focusing the phase modulated second beam to form a second light source image substantially near the frequency plane,
transform lens means located substantially at the lens plane for Fourier transforming the first light source image and the second light source image into a plurality of interference fringes in the image plane,
photosensing means for detecting the interference fringes in the image plane.

40. A system for generating an image of an object, the object being defined by a plurality of basis functions, each of the plurality of basis functions comprising a plurality of parameters, the system comprising:

sensing means for measuring the parameters of the basis functions that satisfy a Bragg condition with respect to the sensing means, and image synthesis means for generating a reconstructed image of the object using the measured parameters of the basis functions, wherein the image synthesis means defines a frequency plane and an image plane, the planes being in mutually spaced, substantially parallel relationship, and wherein the image synthesis means comprises:

beam generator means for generating a collimated beam defining an amplitude and a phase, amplitude modulation means for modulating the amplitude of the beam, deflection means for deflecting the beam in at least two substantially perpendicular directions, focusing lens means for focusing the beam to form a light source image substantially in the frequency plane, Fourier transform lens means for recollimating the beam into a plane wave travelling at an angle determined by the deflection means, beam splitting means for dividing the beam into a first beam and a second beam, phase modulation means for modulating the phase of the second beam, inversion/curvature lens means for inverting the first beam and for creating wavefront curvature in the first beam, whereby the first beam defines a tilt that appears to emanate from a virtual source diametrically opposite the light source image in the frequency plane means for directing the phase modulated second beam through the beam splitter onto the image plane means for directing the first beam through the beam splitter onto the image plane, whereby the first beam and the second beam produce a plurality of interference fringes in the image plane, and photosensing means for detecting the interference fringes in the image plane.

41. A system for generating an image of an object, the object being defined by a plurality of basis functions, each of the plurality of basis functions comprising a plurality of parameters, the system comprising:

sensing means for measuring the parameters of the basis functions that satisfy a Bragg condition with respect to the sensing means, and image synthesis means for generating a reconstructed image of the object using the measured parameters of the basis functions, wherein the image synthesis means defines a focusing plane and a frequency plane, the focusing plane and the frequency plane being in mutually spaced, substantially parallel relationship, and wherein the image synthesis means comprises:

deflection means for deflecting a collimated beam in response to a signal defining an amplitude and a spatial frequency of a basis function, focusing lens means located substantially at the focusing plane for focusing the collimated beam to form light source images substantially at the frequency plane, the light source images substantially at the frequency plane defining amplitudes, photosensing means for detecting the amplitudes of the light source images at the frequency plane, storage means for recording the amplitudes of the light source images at the frequency plane to thereby define a frequency map, transform means for Fourier transforming the recorded amplitudes of the frequency map into a plurality of amplitudes defining an image map, display means for displaying the image map.

42. The system as in claim 41 wherein the deflection means comprises a spatial light modulator.

43. The system as in claim 42 wherein the deflection means comprises a pair of substantially orthogonally oriented acousto-optic Bragg cells.

44. The system as in claim 41 wherein the photosensing means comprises a plurality of photosensors having a substantially rectilinear, linearly spaced format.

45. The system as in claim 41 wherein the transform means comprises processor means for performing a digital fast Fourier transform.

46. The system as in claim 41 wherein the transform means comprises an electronic processor.

47. The system as in claim 41 wherein the transform means comprises a two-dimensional optical processor.

48. The system as in claim 47 wherein the two-dimensional optical processor comprises a lens system for performing a two-dimensional Fourier transform.

49. The system as in claim 41 wherein the display means comprises a data storage medium.

50. A system for generating an image of an object, the object being defined by a plurality of basis functions, each of the plurality of basis functions comprising a plurality of measurable parameters, the system comprising:

image synthesis means for generating a reconstructed image of the object using measured parameters of the basis functions, the image synthesis means comprising:

means for interfering wavelike energy to thereby recreate the basis functions, means for detecting the recreated basis functions, and means for summing the recreated basis functions over time.

51. A system for generating an image of an object, the object being defined by a plurality of basis functions, each of the plurality of basis functions comprising a plurality of measurable parameters, the system comprising:

image synthesis means for generating a reconstructed image of the object using measured parameters of the basis functions, wherein the image synthesis means defines a focusing plane, a frequency plane, a lens plane and an image plane, the planes being in mutually spaced, substantially parallel relationship, and wherein the image synthesis means comprises:

focusing lens means located substantially at the focusing plane for focusing collimated light waves to form light source images substantially at the frequency plane, curvature lens means axially displaced a distance $\xi$ from the focusing plane for focusing collimated light waves to form light source images displaced a distance $\epsilon$ from the frequency plane, transform lens means located substantially at the lens plane for Fourier transforming the light source images in the frequency plane into a plurality of interference fringes in an image plane, whereby the transform lens means produces a plane wave from the light source images located in the frequency plane and produces a spherical wave from the light source images with curvature defined by the displacement ϵ, and photosensing means for detecting the interference fringes in the image plane.

52. A system for generating an image of an object, the object being defined by a plurality of basis functions, each of the plurality of basis functions comprising a plurality of measurable parameters, the system comprising:

image synthesis means for generating a reconstructed image of the object using measured parameters of the basis functions, wherein the image synthesis means defines a frequency plane, a lens plane and an image plane, the planes being in mutually spaced, substantially parallel relationship, and wherein the image synthesis means comprises:

beam generator means for generating a collimated beam defining an amplitude and a phase, amplitude modulation means for modulating the amplitude of the collimated beam, beam splitting means for dividing the amplitude modulated beam into a first beam and a second beam, deflection means for deflecting the first beam in at least two substantially perpendicular directions, focusing lens means for focusing the deflected first beam to form a first light source image substantially at the frequency plane, phase modulation means for modulating the phase of the second beam, curvature lens means for focusing the phase modulated second beam to form a second light source image substantially near the frequency plane, transform lens means located substantially at the lens plane for Fourier transforming the first light source image and the second light source image into a plurality of interference fringes in the image plane, photosensing means for detecting the interference fringes in the image plane.

53. A system for generating an image of an object, the object being defined by a plurality of basis functions, each of the plurality of basis functions comprising a plurality of measurable parameters, the system comprising:

image synthesis means for generating a reconstructed image of the object using measured parameters of the basis functions, wherein the image synthesis means defines a frequency plane and an image plane, the planes being in mutually spaced, substantially parallel relationship, and wherein the image synthesis means comprises:

beam generator means for generating a collimated beam defining an amplitude and a phase, amplitude modulation means for modulating the amplitude of the beam, deflection means for deflecting the beam in at least two substantially perpendicular directions, focusing lens means for focusing the beam to form a light source image substantially in the frequency plane, Fourier transform lens means for recollimating the beam into a plane wave travelling at an angle determined by the deflection means, beam splitting means for dividing the beam into a first beam and a second beam, phase modulation means for modulating the phase of the second beam, inversion/curvature lens means for inverting the first beam and for creating wavefront curvature in the first beam, whereby the first beam defines a tilt that appears to emanate from a virtual source diametrically opposite the light source image in the frequency plane means for directing the phase modulated second beam through the beam splitter onto the image plane means for directing the first beam through the beam splitter onto the image plane, whereby the first beam and the second beam produce a plurality of interference fringes in the image plane, and photosensing means for detecting the interference fringes in the image plane.

54. A system for generating an image of an object, the object being defined by a plurality of basis functions, each of the plurality of basis functions comprising a plurality of parameters, the system comprising:

a focusing plane, a frequency plane, a lens plane and an image plane, the planes being in mutually spaced, substantially parallel relationship, focusing lens means located substantially at the focusing plane for focusing collimated light waves to form light source images substantially at the frequency plane, transform lens means located substantially at the lens plane for Fourier transforming the light source images in the frequency plane into a plurality of interference fringes in the image plane, the plurality of interference fringes in the image plane comprising scaled copies of the basis functions that define the object, photosensing means for detecting the interference fringes in the image plane, and means for integrating the plurality of interference fringes.

55. The system as in claim 54 wherein the transform lens means defines a focal length, the frequency plane and the lens plane are separated by a distance substantially equal to the focal length of the transform lens, and the lens plane and the image plane are separated by a distance substantially equal to the focal length of the transform lens.

56. A system for generating an image of an object, the object being defined by a plurality of basis functions, each of the plurality of basis functions comprising a plurality of parameters, the system comprising:

a focusing plane and a frequency plane, the focusing plane and the frequency plane being in mutually spaced, substantially parallel relationship, deflection means for deflecting a collimated beam in response to a signal defining an amplitude and a spatial frequency of a basis function, focusing means located substantially at the focusing plane for focusing the collimated beam to form light source images substantially at the frequency plane, the light source images substantially at the frequency plane defining amplitudes, photosensing means for detecting the amplitudes of the light source images at the frequency plane, recording means for recording the amplitudes of the light source images at the frequency plane to thereby define a frequency map, transform means for Fourier transforming the recorded amplitudes of the frequency map into a plurality of amplitudes defining an image map, and display means for displaying the image map.

57. The system as in claim 56 wherein the deflection means comprises a spatial light modulator.

58. The system as in claim 57 wherein the deflection means comprises a pair of substantially orthogonally oriented acoustooptic Bragg cells.

59. The system as in claim 56 wherein the photosensing means comprises a plurality of photosensors having a substantially rectilinear, linearly spaced format.

60. The system as in claim 56 wherein the transform means comprises processor means for performing a digital fast Fourier transform.

61. The system as in claim 56 wherein the transform means comprises an electronic processor.

62. The system as in claim 56 wherein the transform means comprises a two-dimensional optical processor.

63. The system as in claim 62 wherein the two-dimensional optical processor comprises a lens system for performing a two-dimensional Fourier transform.

64. The system as in claim 56 wherein the display means comprises a data storage medium.

65. A method for generating an image of an object, the object being defined by a plurality of basis functions, each of the plurality of basis functions comprising a plurality of parameters, the method comprising the steps of:

defining a frequency plane, deflecting a collimated beam in response to a signal defining an amplitude and a spatial frequency of a basis function, focusing the collimated beam to form light source images substantially at the frequency plane, the light source images substantially at the frequency plane defining amplitudes, detecting the amplitudes of the light source images at the frequency plane, recording the amplitudes of the light source images at the frequency plane to thereby define a frequency map, Fourier transforming the recorded amplitudes of the frequency map into a plurality of amplitudes defining an image map, and displaying the image map.

66. The method as in claim 65 wherein each frequency amplitude is bipolar and has a complex value and wherein the deflecting, focusing, detecting, and recording steps are repeated a plurality of four times for each frequency amplitude.

67. The method as in claim 65 wherein the deflecting step is performed using a pair of substantially orthogonally oriented acousto-optic Bragg cells.

68. The method as in claim 65 wherein the transforming step is performed using a digital fast Fourier transform algorithm.

69. The method as in claim 65 wherein the transforming step is performed using electronic discrete Fourier transform techniques.

70. The method as in claim 65 wherein the transforming step is performed using optical Fourier transform techniques.

71. A system for generating an image of an object, the object having at least one spatial component and defining at least one basis function having an amplitude and a phase, the system comprising:

reference signal generator means for generating a reference signal, the reference signal having an amplitude, a phase and a frequency, range delay means for generating a delayed signal, the delayed signal corresponding to the reference signal delayed by a length of time, transmitter means for transmitting a signal toward the object, the transmitted signal corresponding to the reference signal, receiver means for receiving a scattered signal from the object, the scattered signal corresponding to a signal scattered by a spatial component of the object satisfying a Bragg condition with respect to the transmitted signal, comparator means for comparing the scattered signal and the delayed signal and for generating output signals corresponding to the amplitude and the phase of a basis function of the object, and image synthesis means for generating a reconstructed image of the object in response to the output signals generated by the comparator means, the image synthesis means comprising:

means for interfering wavelike energy to thereby recreate a basis function, means for detecting the recreated basis function, and means for summing a plurality of recreated basis functions over time.

72. The system as in claim 71, wherein the system comprises a radar imaging system and wherein the transmitter means comprises means for transmitting a radar signal and the receiver means comprises means for receiving a radar signal.

73. The system as in claim 72, wherein the system comprises a synthetic aperture radar imaging system and further comprises means for moving at least one of the transmitter means and the receiver means relative to the object.

74. The system as in claim 72, wherein the system comprises an inverse synthetic aperture radar imaging system and further comprises means for moving the object relative to at least one of the transmitter means and the receiver means.

75. The system as in claim 71, wherein the system comprises a coherent optical imaging system and wherein the transmitter means comprises means for transmitting a coherent optical signal and the receiver means comprises means for receiving a coherent optical signal.

76. The system as in claim 71, wherein the system comprises an acoustic imaging system and wherein the transmitter means comprises means for transmitting an acoustic signal and the receiver means comprises means for receiving an acoustic signal.

77. The system as in claim 71, wherein the object and the transmitter means are in relative motion and further comprising motion compensator means for modifying the scattered signal in response to the relative motion of the object and the transmitter means.

78. The system as in claim 71, wherein the object defines a coordinate system having a center and wherein the time by which the delayed signal is delayed relative to the reference signal is substantially equal to the round trip propagation time of the transmitted wave to the center of the coordinate system.

79. The system as in claim 71, wherein the transmitted signal defines a spatial frequency and further comprising means for introducing a time dependence to the spatial frequency of the transmitted signal.

80. A system for generating an image of an object, the object having at least one spatial component and defining at least one basis function having an amplitude and a phase, the system comprising:

reference signal generator means for generating a reference signal, the reference signal having an amplitude, a frequency and a phase, transmitter means for transmitting a transmitted signal toward the object, the transmitted signal corresponding to the reference signal, receiver means for receiving a scattered signal from the object, the scattered signal corresponding to a signal scattered by a spatial component of the object satisfying a Bragg condition with respect to the transmitted signal, comparator means for comparing the scattered signal and the reference signal and for generating output signals corresponding to the amplitude and the phase of a basis function of the object, and image synthesis means for generating a reconstructed image of the object in response to the output signals generated by the comparator means, the image synthesis means comprising:

means for interfering wavelike energy to thereby recreate a basis function, means for detecting the recreated basis function, and means for summing a plurality of recreated basis functions over time.

81. A system for generating an image of an object, the object having at least one spatial component and defining a plurality of basis functions having an amplitude and a phase, the system comprising, transmitter means for generating a signal which induces a time-dependent spatial response within the object, receiver means for sensing the time-dependent spatial response within the object, sampling means for generating a plurality of samples of the time-dependant spatial response within the object sensed by the receiver means, the plurality of samples corresponding to a plurality of complex amplitudes of the basis functions, controller means for associating samples generated by the sampling means and vector spatial frequencies of spatial basis functions of the object and for generating a plurality of output signals, each of the plurality of output signals corresponding to an amplitude, a phase, and a vector spatial frequency of a basis function, and image synthesis means for generating a reconstructed image of the object in response to the plurality of output signals generated by the controller means, the image synthesis means comprising:

means for interfering wavelike energy to thereby recreate a basis function, means for detecting the recreated basis function, and means for summing a plurality of recreated basis functions over time.

82. The system as in claim 81 wherein the system comprises a magnetic resonance imaging system and wherein the transmitter means and the receiver means comprise a magnetic resonance measurement device.

83. A method for generating an image of an object, the object having at least one spatial component and defining at least one basis function having an amplitude and a phase, the method comprising:

generating a reference signal, the reference signal having an amplitude, a frequency and a phase, transmitting a transmitted signal toward the object, the transmitted signal corresponding to the reference signal, generating a delayed signal, the delayed signal corresponding to the reference signal delayed by a length of time, receiving a scattered signal from the object, the scattered signal corresponding to a signal scattered by a spatial component of the object satisfying a Bragg condition with respect to the transmitted signal, comparing the scattered signal and the delayed signal, generating output signals in response to the comparison of the scattered signal and the delayed signal, the output signals corresponding to the amplitude and the phase of a basis function of the object, and generating a reconstructed image of the object in response to the output signals, the step of generating a reconstructed image comprising:

interfering wavelike energy to thereby recreate a basis function, detecting the recreated basis function, and summing a plurality of recreated basis functions over time.

84. The method as in claim 83, wherein the method comprises a radar imaging method and wherein the transmitting step comprises the step of transmitting a radar signal and the receiving step comprises the step of receiving a radar signal.

85. The method as in claim 84, wherein the method comprises a synthetic aperture radar imaging method, wherein the transmitting step is performed by a radar transmitter, wherein the receiving step is performed by a radar receiver, and further comprising the step of moving at least one of the radar transmitter and the radar receiver relative to the object.

86. The method as in claim 84, wherein the method comprises an inverse synthetic aperture radar imaging method, wherein the transmitting step is performed by a radar transmitter, wherein the receiving step is performed by a radar receiver, and further comprising the step of moving the object relative to at least one of the radar transmitter and the radar receiver.

87. The method as in claim 83, wherein the method comprises an acoustic imaging method and wherein the transmitting step comprises the step of transmitting an acoustic signal and the receiving step comprises the step of receiving an acoustic signal.

88. The method as in claim 83, wherein the method comprises a coherent optical imaging method and wherein the transmitting step comprises the step of transmitting a coherent optical signal and the receiving step comprises the step of receiving a coherent optical signal.

89. A system for generating an image of an object, the object having at least one spatial component and defining at least one basis function having an amplitude and a phase, the system comprising:

transmitted radiation means for irradiating the object with a transmitted wave, reference radiation means for irradiating the object with a reference wave, whereby the transmitted wave and the reference wave interfere on the object and create a plurality of fringes, the plurality of fringes defining a scattered radiation amplitude and a spatial frequency, receiver means for measuring the scattered radiation amplitude, the scattered radiation amplitude corresponding to a signal scattered by a spatial component of the object satisfying a Bragg condition with respect to the interference of the reference wave and the transmitted wave, comparator means for comparing the scattered radiation amplitude of a plurality of fringes having a first phase and spatial frequency and the scattered radiation amplitude of a plurality of fringes having a second phase and for generating output signals based upon the compared scattered radiation amplitudes, the output signals corresponding to the amplitude and the phase of a basis function of the object, controller means for varying the phase and the spatial frequency of the plurality of fringes, and image synthesis means for generating a reconstructed image of the object in response to the output signals generated by the comparator means, the image synthesis means comprising:

means for interfering wavelike energy to thereby recreate a basis function, means for detecting the recreated basis function, and means for summing a plurality of recreated basis functions over time.

90. The system as in claim 89 wherein the transmitted radiation means comprises means for transmitting an optical wave and the receiver means comprises means for receiving an optical wave.

91. The system as in claim 89, wherein the system comprises a radar imaging system and wherein the transmitted radiation means comprises means for transmitting a radar wave and the receiver means comprises means for receiving a radar wave.

92. The system as in claim 91, wherein the system comprises a synthetic aperture radar imaging system and further comprising means for moving at least one of the transmitted radiation means and the receiver means relative to the object.

93. The system as in claim 91, wherein the system comprises an inverse synthetic aperture radar imaging system and further comprising means for moving the object relative to at least one of the transmitted radiation means and the receiver means.

94. The system as in claim 89, wherein the system comprises an acoustic imaging system and wherein the transmitted radiation means comprises means for transmitting an acoustic wave and the receiver means comprises means for receiving an acoustic wave.

95. The system as in claim 89 wherein the transmitted radiation means and the reference radiation means each comprise a source of coherent light.

96. The system as in claim 89 wherein the transmitted radiation means and the reference radiation means each comprise a source of electromagnetic radiation.

97. The system as in claim 89 wherein the transmitted radiation means and the reference radiation means each comprise a coherent source of particle radiation.

98. The system as in claim 89 wherein the receiver means comprises a collecting lens and a photodetector.

99. The system as in claim 89 wherein the controller means comprises means for controlling the position of the object relative to at least one of the transmitted and reference radiation means and the receiver means.

100. The system as in claim 99 wherein the controller means comprises a rotatable platform on which the object is placed and means for controlling the rotation of the platform.

101. The system as in claim 89 wherein the transmitted and reference waves define an angle of interference and wherein the controller means comprises means for monitoring and controlling the angle of interference.

102. The system as in claim 89 wherein the plurality of fringes define a phase and wherein the controller means comprises phase modulator means for modulating the phase of the plurality of fringes.

103. A method for generating an image of an object, the object defining at least one basis function, the method comprising:

irradiating the object with a transmitted wave, irradiating the object with a reference wave, the transmitted wave and the reference wave interfering on the object and creating a plurality of fringes, the plurality of fringes defining a spatial frequency and a scattered radiation amplitude, measuring the scattered radiation amplitude of the plurality of fringes to thereby obtain a first scattered radiation amplitude measurement, varying the phase of the plurality of fringes, measuring the scattered radiation amplitude of the plurality of fringes after varying the phase of the plurality of fringes to thereby obtain a second scattered radiation amplitude measurement, comparing the first and second scattered radiation amplitude measurements to thereby obtain a compared scattered radiation complex amplitude measurement, the complex amplitude corresponding to an amplitude and a phase of a basis function, and generating an image of the object based upon a plurality of compared scattered radiation amplitude measurements, the step of generating an image of the object comprising:

interfering wavelike energy to thereby recreate a basis function, detecting the recreated basis function, and summing a plurality of recreated basis functions over time.

104. The method as in claim 103 wherein the step of irradiating the object with a transmitted wave comprises the step of irradiating the object with an optical wave.

105. The method as in claim 103, wherein the method comprises an acoustic imaging method and wherein the step of irradiating the object with a transmitted wave comprises the step of irradiating the object with an acoustic wave.

106. The method as in claim 103, wherein the method comprises a radar imaging method and wherein the step of irradiating the object with a transmitted wave comprises the step of irradiating the object with a radar wave.

107. The method as in claim 106, wherein the method comprises a synthetic aperture radar imaging method, wherein the step of irradiating the object with a transmitted wave is performed by a radar transmitter, and further comprising the step of moving the radar transmitter relative to the object.

108. The method as in claim 106, wherein the method comprises an inverse synthetic aperture radar imaging method, wherein the step of irradiating the object with a transmitted wave is performed by a radar transmitter, and further comprising the step of moving the object relative to the radar transmitter.

109. The method as in claim 103 wherein the step of varying the phase of the plurality of fringes comprises the step of varying the phase of the plurality of fringes so that the phase of the plurality of fringes after the varying step differs from the phase of the plurality of fringes before the varying step by $\pi/2$ radians.

110. The method as in claim 103 wherein the transmitted wave defines a first temporal frequency having a magnitude, the reference wave defines a second temporal frequency having a magnitude, and wherein the step of varying the spatial frequency of the plurality of fringes comprises the step of varying the relative magnitudes of the first and second temporal frequencies, whereby a travelling fringe pattern is created on the object.

111. A system for generating an image of an object, the object defining at least one basis function, the at least one basis function being defined by an amplitude, a phase and a spatial frequency, the system comprising:
means for irradiating the object with a transmitted wave,
means for irradiating the object with a reference wave, the transmitted wave and the reference wave interfering on the object and creating a plurality of fringes, the plurality of fringes defining a spatial frequency and a scattered radiation amplitude,
means for measuring the scattered radiation amplitude of the plurality of fringes to thereby obtain a first scattered radiation amplitude measurement,
means for comparing the scattered radiation amplitude of a plurality of fringes having a first phase and spatial frequency and the scattered radiation amplitude of a plurality of fringes having a second phase and for generating output signals based upon the compared scattered radiation amplitudes, the output signals corresponding to the amplitude and the phase of a basis function of the object,
means for varying the phase and the spatial frequency of the plurality of fringes, and
means for generating an image of the object based upon a plurality of compared scattered radiation amplitude measurements, the means for generating an image of the object comprising:
means for interfering wavelike energy to thereby recreate a basis function,
means for detecting the recreated basis function, and
means for summing a plurality of recreated basis functions over time.

112. The system as in claim 111 wherein the plurality of fringes defines a phase and wherein the means for varying the spatial frequency of the plurality of fringes comprises means for varying the phase of the plurality of fringes by $\pi/2$ radians.

113. The system as in claim 111 wherein the transmitted wave defines a first temporal frequency having a magnitude, the reference wave defines a second temporal frequency having a magnitude, and wherein the means for varying the spatial frequency of the plurality of fringes comprises means for varying the relative magnitudes of the first and second temporal frequencies, whereby a travelling fringe pattern is created on the object.

114. A system for generating an image of an object, the object having at least one spatial component and defining at least one basis function having an amplitude and a phase, the system comprising:
a plurality of radiation emitters for irradiating the object,
modulation means for spatially modulating the plurality of radiation emitters to establish a first modulation of radiation intensity defining a first phase,
modulation means for spatially modulating the plurality of radiation emitters to establish a second modulation of radiation intensity defining a second phase, the first phase and the second phase differing by $\pi/2$ radians
radiation detection means for detecting radiation scattered by the object from the first modulation of radiation intensity and radiation scattered by the object from the second modulation of radiation intensity,
integrator means for comparing radiation scattered by the object from the first and second modulations of radiation intensity and for generating output signals based upon the compared radiation, the output signals corresponding to the amplitude and the phase of a basis function of the object, and
image synthesis means for generating a reconstructed image of the object in response to the output signals generated by the integrator means, the image synthesis means comprising:
means for interfering wavelike energy to thereby recreate a basis function,
means for detecting the recreated basis function, and
means for summing a plurality of recreated basis functions over time.

115. The system as in claim 114 wherein the radiation emitters comprise means for emitting radio frequency electromagnetic waves.

116. The system as in claim 114 wherein the radiation emitters comprise means for emitting optical waves.

117. The system as in claim 114 wherein the radiation emitters comprises means for emitting x-rays.

118. The system as in claim 114 wherein the radiation emitters comprise means for emitting gamma rays.

119. The system as in claim 114 wherein the radiation emitters comprise means for emitting acoustic waves.

120. A system for generating an image of an object, the object having at least one spatial component and defining at least one basis function having an amplitude and a phase, the system comprising:
a plurality of radiation emitters for irradiating the object,
radiation detection means for detecting the irradiating radiation,
Fourier analysis means for performing a Fourier analysis of the detected radiation signal and for generating a sequence of output signals, the output signals corresponding to the amplitude and the phase of a basis function of the object, and
image synthesis means for generating a reconstructed image of the object in response to the output signals generated by the Fourier analysis means, the image synthesis means comprising:
means for interfering wavelike energy to thereby recreate a basis function,
means for detecting the recreated basis function, and
means for summing a plurality of recreated basis functions over time.

121. The system as in claim 120 wherein the means for performing the Fourier analysis comprises a digital processor.

122. The system as in claim 120 wherein the means for performing the Fourier analysis comprises an optical processor.

123. The system as in claim 120 wherein the radiation emitters comprise means for emitting x-rays.

124. The system as in claim 120 wherein the radiation emitters comprise means for emitting gamma rays.

125. The system as in claim 120 wherein the radiation emitters comprise means for emitting radio frequency electromagnetic waves.

126. The system as in claim 120 wherein the radiation emitters comprise means for emitting optical waves.

127. The system as in claim 120 wherein the radiation emitters comprise means for emitting acoustic waves.

128. A method for generating an image of an object, the object having at least one spatial component and defining at least one basis function having an amplitude and a phase, the method comprising the steps of:
   irradiating the object with radiation,
   detecting the irradiating radiation after it has interacted with the object,
   performing a Fourier analysis of the detected radiation signal and generating a sequence of output signals, the output signals corresponding to the amplitude and the phase of a basis function of the object, and
   generating a reconstructed image of the object in response to the output signals generated by the Fourier analysis, the step of generating a reconstructed image of the object comprising:
   interfering wavelike energy to thereby recreate a basis function,
   detecting the recreated basis function, and
   summing a plurality of recreated basis functions over time.

129. The method as in claim 128 wherein the irradiating step comprises the step of irradiating the object with x-rays.

130. The method as in claim 128 wherein the irradiating step comprises the step of irradiating the object with acoustic waves.

131. The method as in claim 128 wherein the irradiating step comprises the step of irradiating the object with radio waves.

132. The method as in claim 128 wherein the irradiating step comprises the step of irradiating the object with optical waves.

133. A system for generating an image of an object, wherein the object is represented as an expansion of spatial basis function parameters in accordance with the following equation:

$$T(x) = \int_{-\infty}^{\infty} A(\xi)B(x, \xi)d\xi \quad (1)$$

where T(x) represents the object, B(x,ξ) represents a linear combination of orthogonal basis functions defined at every point x in the object and characterized by a set of parameters ξ, and A represents the amplitude of the basis function, the system comprising:
   sensing means for measuring the amplitudes A of the basis functions that satisfy a Bragg condition with respect to the sensing means, and
   image synthesis means for generating a reconstructed image of the object using the measured amplitudes of the basis functions and the parameters ξ, the image synthesis means comprising:
   means for interfering wavelike energy to thereby recreate the basis functions,
   means for detecting the recreated basis functions, and
   means for summing a plurality of the recreated basis functions over time.

134. The system as in claim 133 wherein the sensing means comprises means for sequentially measuring the amplitudes A of the basis functions over time.

135. The system as in claim 133 wherein the basis functions are substantially sinusoidal and wherein the sensing means comprises means for transmitting plane waves.

136. The system as in claim 133 wherein the basis functions have curvature and wherein the sensing means comprises means for transmitting spherical waves.

137. A method for generating an image of an object, wherein the object is represented as an expansion of spatial basis function parameters in accordance with the following equation:

$$T(x) = \int_{-\infty}^{\infty} A(\xi)B(x, \xi)d\xi \quad (1)$$

where T(x) represents the object, B(x,ξ) represents a linear combination of orthogonal basis functions defined at every point x in the object and characterized by a set of parameters ξ, and A represents the amplitude of the basis function, the system comprising:
   measuring the amplitudes A of the basis functions that satisfy a Bragg condition with respect to the sensing means, and
   generating a reconstructed image of the object using the measured amplitudes of the basis functions and the parameters ξ, the step of generating a reconstructed image of the object comprising:
   interfering wavelike energy to thereby recreate the basis functions,
   detecting the recreated basis functions, and
   summing a plurality of the recreated basis functions over time.

138. The method as in claim 137 wherein the measuring step comprises the step of sequentially measuring the amplitudes A of the basis functions over time.

139. The method as in claim 137 wherein the basis functions are substantially sinusoidal and wherein the measuring step comprises the step of transmitting plane waves.

140. The method as in claim 137 wherein the basis functions have curvature and wherein the measuring step comprises the step of transmitting spherical waves.

141. The system of claim 41, wherein the object has at least one spatial component and defines at least one basis function having an amplitude and a phase, the system further comprising:
   reference signal generator means for generating a reference signal, the reference signal having an amplitude, a phase and a frequency,
   range delay means for generating a delayed signal, the delayed signal corresponding to the reference signal delayed by a length of time,
   transmitter means for transmitting a signal toward the object, the transmitted signal corresponding to the reference signal,
   receiver means for receiving a scattered signal from the object, the scattered signal corresponding to a signal scattered by a spatial component of the object satisfying a Bragg condition with respect to the transmitted signal, and comparator means for comparing the scattered signal and the delayed signal and for generating output signals corresponding to the amplitude and the phase of a basis function of the object.

142. The system of claim 41, wherein the object has at least one spatial component and defines at least one basis function having an amplitude and a phase, the system further comprising:
reference signal generator means for generating a reference signal, the reference signal having an amplitude, a frequency and a phase,
transmitter means for transmitting a transmitted signal toward the object, the transmitted signal corresponding to the reference signal,
receiver means for receiving a scattered signal from the object, the scattered signal corresponding to a signal scattered by a spatial component of the object satisfying a Bragg condition with respect to the transmitted signal, and
comparator means for comparing the scattered signal and the reference signal and for generating output signals corresponding to the amplitude and the phase of a basis function of the object.

143. The system of claim 41, wherein the object has at least one spatial component and defines a plurality of basis functions having an amplitude and a phase, the system further comprising,
transmitter means for generating a signal which induces a time-dependent spatial response within the object,
receiver means for sensing the time-dependent spatial response within the object,
sampling means for generating a plurality of samples of the time-dependant spatial response within the object sensed by the receiver means, the plurality of samples corresponding to a plurality of complex amplitudes of the basis functions, and
controller means for associating samples generated by the sampling means and vector spatial frequencies of spatial basis functions of the object and for generating a plurality of output signals, each of the plurality of output signals corresponding to an amplitude, a phase, and a vector spatial frequency of a basis function.

144. The system of claim 41, wherein the object has at least one spatial component and defines at least one basis function having an amplitude and a phase, the system further comprising:
transmitted radiation means for irradiating the object with a transmitted wave,
reference radiation means for irradiating the object with a reference wave, whereby the transmitted wave and the reference wave interfere on the object and create a plurality of fringes, the plurality of fringes defining a scattered radiation amplitude and a spatial frequency,
receiver means for measuring the scattered radiation amplitude, the scattered radiation amplitude corresponding to a signal scattered by a spatial component of the object satisfying a Bragg condition with respect to the interference of the reference wave and the transmitted wave,
comparator means for comparing the scattered radiation amplitude of a plurality of fringes having a first phase and spatial frequency and the scattered radiation amplitude of a plurality of fringes having a second phase and for generating output signals based upon the compared scattered radiation amplitudes, the output signals corresponding to the amplitude and the phase of a basis function of the object, and
controller means for varying the phase and the spatial frequency of the plurality of fringes.

145. The system of claim 41, wherein the object defines at least one basis function, the system further comprising:
means for irradiating the object with a transmitted wave,
means for irradiating the object with a reference wave, the transmitted wave and the reference wave interfering on the object and creating a plurality of fringes, the plurality of fringes defines a spatial frequency and a scattered radiation amplitude,
means for measuring the scattered radiation amplitude of the plurality of fringes to thereby obtain a first scattered radiation amplitude measurement,
means for comparing the scattered radiation amplitude of a plurality of fringes having a first phase and spatial frequency and the scattered radiation amplitude of a plurality of fringes having a second phase and for generating output signals based upon the compared scattered radiation amplitudes, the output signals corresponding to the amplitude and the phase of a basis function of the object, and
means for varying the phase and the spatial frequency of the plurality of fringes.

146. The system of claim 41, wherein the object has at least one spatial component and defines at least one basis function having an amplitude and a phase, the system further comprising:
a plurality of radiation emitters for irradiating the object,
modulation means for spatially modulating the plurality of radiation emitters to establish a first modulation of radiation intensity defining a first phase,
modulation means for spatially modulating the plurality of radiation emitters to establish a second modulation of radiation intensity defining a second phase, the first phase and the second phase differing by $\pi/2$ radians
radiation detection means for detecting radiation scattered by the object from the first modulation of radiation intensity and radiation scattered by the object from the second modulation of radiation intensity, and
integrator means for comparing radiation scattered by the object from the first and second modulations of radiation intensity and for generating output signals based upon the compared radiation, the output signals corresponding to the amplitude and the phase of a basis function of the object.

147. The system of claim 41, wherein the object has at least one spatial component and defines at least one basis function having an amplitude and a phase, the system further comprising:
a plurality of radiation emitters for irradiating the object,
radiation detection means for detecting the irradiating radiation, and
Fourier analysis means for performing a Fourier analysis of the detected radiation signal and for generating a sequence of output signals, the output signals corresponding to the amplitude and the phase of a basis function of the object.

148. The system of claim 13 wherein the integration means comprises a digital memory and an arithmetic processor for accumulating digitized data.

149. The system of claim 50 wherein the means for summing the recreated basis functions over time comprises a digital memory and an arithmetic processor for accumulating digitized data.

150. The system of claim 8, wherein the wavelike energy comprises light and wherein the means for interfering wavelike energy comprises means for interfering light.

151. The system of claim 12 wherein the energy sensor array comprises a photosensor array and wherein the projection means comprises an optical projection system.

152. A method for generating an image of an object, the object being defined by a plurality of basis functions, each of the plurality of basis functions comprising a plurality of parameters, the method comprising:
providing a sensing means for measuring the parameters of the basis functions that satisfy a Bragg condition with respect to the sensing means, and
generating a reconstructed image of the object using the measured parameters of the basis functions,
the step of generating a reconstructed image of the object comprising:
interfering wavelike energy to thereby recreate the basis functions,
detecting the recreated basis functions, and
summing the recreated basis functions over time.

153. A method for generating an image of an object, the object being defined by a plurality of basis functions, each of the plurality of basis functions comprising a plurality of parameters, the method comprising:
measuring the parameters of the basis functions that satisfy a Bragg condition, and
generating a reconstructed image of the object using the measured parameters of the basis functions,
the step of generating a reconstructed image of the object comprising:
interfering wavelike energy to thereby recreate the basis functions,
detecting the recreated basis functions, and
summing the recreated basis functions over time.

154. A method for generating an image of an object, the object being defined by a plurality of basis functions, each of the plurality of basis functions comprising a plurality of parameters, the method comprising:
defining a focusing plane, a frequency plane, a lens plane and an image plane, the planes being in mutually spaced, substantially parallel relationship,
providing focusing lens means located substantially at the focusing plane for focusing collimated light waves to form light source images substantially at the frequency plane,
providing transform lens means located substantially at the lens plane for Fourier transforming the light source images in the frequency plane into a plurality of interference fringes in the image plane, the plurality of interference fringes in the image plane comprising scaled copies of the basis functions that define the object,
detecting the interference fringes in the image plane, and
integrating the plurality of interference fringes.

155. A method for generating an image of an object, the object being defined by a plurality of basis functions, each of the plurality of basis functions comprising a plurality of parameters, the method comprising:
defining a focusing plane and a frequency plane, the focusing plane and the frequency plane being in mutually spaced, substantially parallel relationship,
providing a signal defining an amplitude and a spatial frequency of a basis function,
deflecting a collimated beam in response to the signal,
providing a focusing means substantially at the focusing plane for focusing the collimated beam to form light source images substantially at the frequency plane, the light source images substantially at the frequency plane defining amplitudes,
detecting the amplitudes of the light source images at the frequency plane,
recording the amplitudes of the light source images at the frequency plane to thereby define a frequency map,
Fourier transforming the recorded amplitudes of the frequency map into a plurality of amplitudes defining an image map, and
displaying the image map.

156. A system for generating an image of an object, the object being defined by a plurality of basis functions, each of the plurality of basis functions comprising a plurality of parameters, the system comprising:
sensing means for measuring the parameters of the basis functions that satisfy a Bragg condition with respect to the sensing means, and
image synthesis means for generating a reconstructed image of the object using the measured parameters of the basis functions, wherein the image synthesis means defines a frequency plane, a lens plane and an image plane, the planes being in mutually spaced, substantially parallel relationship, and wherein the image synthesis means comprises:
beam generator means for generating a collimated beam defining an amplitude and a phase,
beam splitting means for dividing the collimated beam into a first beam and a second beam,
amplitude modulation means for modulating the amplitude of the first beam,
deflection means for deflecting the first beam in at least two substantially perpendicular directions,
focusing lens means for focusing the deflected first beam to form a first light source image substantially at the frequency plane,
amplitude and phase modulation means for modulating the amplitude and phase of the second beam,
deflection means for deflecting the second beam in at least two substantially perpendicular directions, the at least two substantially perpendicular directions of the deflected second beam being substantially opposite to the at least two substantially perpendicular directions of the deflected first beam,
curvature lens means for focusing the phase modulated second beam to form a second light source image substantially near the frequency plane,
transform lens means located substantially at the lens plane for Fourier transforming the first light source image and the second light source image into a plurality of interference fringes in the image plane, and
photosensing means for detecting the interference fringes in the image plane.

157. A system for generating an image of an object, the object being defined by a plurality of basis functions, each of the plurality of basis functions comprising a plurality of parameters, the system comprising:

image synthesis means for generating a reconstructed image of the object using the measured parameters of the basis functions, wherein the image synthesis means defines a frequency plane, a lens plane and an image plane, the planes being in mutually spaced, substantially parallel relationship, and wherein the image synthesis means comprises:

beam generator means for generating a collimated beam defining an amplitude and a phase, beam splitting means for dividing the collimated beam into a first beam and a second beam, amplitude modulation means for modulating the amplitude of the first beam, deflection means for deflecting the first beam in at least two substantially perpendicular directions, focusing lens means for focusing the deflected first beam to form a first light source image substantially at the frequency plane, amplitude and phase modulation means for modulating the amplitude and phase of the second beam, deflection means for deflecting the second beam in at least two substantially perpendicular directions, the at least two substantially perpendicular directions of the deflected second beam being substantially opposite to the at least two substantially perpendicular directions of the deflected first beam, curvature lens means for focusing the phase modulated second beam to form a second light source image substantially near the frequency plane, transform lens means located substantially at the lens plane for Fourier transforming the first light source image and the second light source image into a plurality of interference fringes in the image plane, and photosensing means for detecting the interference fringes in the image plane.

* * * * *